United States Patent
Bharitkar et al.

(10) Patent No.: US 10,140,822 B2
(45) Date of Patent: Nov. 27, 2018

(54) LOW BIT RATE PARAMETRIC ENCODING AND TRANSPORT OF HAPTIC-TACTILE SIGNALS

(71) Applicants: DOLBY LABORATORIES LICENSING CORPORATION, San Francisco, CA (US); DOLBY INTERNATIONAL AB, Amsterdam Zuidoost (NL)

(72) Inventors: Sunil Bharitkar, Sherman Oaks, CA (US); Charles Q. Robinson, Piedmont, CA (US); Vivek Kumar, San Bruno, CA (US); Jeffrey Riedmiller, Penngrove, CA (US); Christof Fersch, Neumarkt (DE)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 15/747,096

(22) PCT Filed: Aug. 3, 2016

(86) PCT No.: PCT/US2016/045291
§ 371 (c)(1),
(2) Date: Jan. 23, 2018

(87) PCT Pub. No.: WO2017/024001
PCT Pub. Date: Feb. 9, 2017

(65) Prior Publication Data
US 2018/0218576 A1 Aug. 2, 2018

Related U.S. Application Data

(60) Provisional application No. 62/303,281, filed on Mar. 3, 2016, provisional application No. 62/222,100, filed
(Continued)

(30) Foreign Application Priority Data

Nov. 5, 2015 (EP) .................................... 15193236

(51) Int. Cl.
*H04B 3/36* (2006.01)
*G08B 6/00* (2006.01)
*G10L 19/16* (2013.01)

(52) U.S. Cl.
CPC .............. *G08B 6/00* (2013.01); *G10L 19/167* (2013.01)

(58) Field of Classification Search
CPC ... G06F 3/01; G06F 3/011; G08B 6/00; G10L 19/167
(Continued)

(56) References Cited

U.S. PATENT DOCUMENTS 7,911,328 B2  3/2011  Luden
8,000,825 B2  8/2011  Ullrich
(Continued)

FOREIGN PATENT DOCUMENTS

EP   2728443   5/2014
EP   2881945   6/2015

OTHER PUBLICATIONS

Herman, D.D. et al "Criterion shifts in the measurement of tactile masking" Attention, Perception, & Psychophysics, 8:433-436, Nov. 1970.
Verrillo, R.T. "Psychophysics of vibrotactile stimulation" J. Acoust. Soc. Amer., 77:225-232, Jan. 1985.
(Continued)

*Primary Examiner* — Thomas Mullen

(57) ABSTRACT

Techniques for low bit rate parametric encoding of haptic-tactile signals. The techniques encompass a parametric encoding method. The parametric encoding method includes the steps of: for at least one frame of a plurality of frames of a source haptic-tactile signal, representing the source haptic-tactile signal in the frame as a set of parameters and according to a functional representation; and including the set of parameters in a bit stream that encodes the source
(Continued)

haptic-tactile signal. The functional representation is based on one of a set of orthogonal functionals, or polynomial approximation. For example, the functional representation can be based on one of Chebyshev functionals of the first kind through order n, Chebyshev functionals of the second kind through order n, or k-th order polynomial approximation.

16 Claims, 18 Drawing Sheets

Related U.S. Application Data on Sep. 22, 2015, provisional application No. 62/201,185, filed on Aug. 5, 2015.

(58) Field of Classification Search
USPC ............ 340/407.1, 407.2; 345/156, 168, 173
See application file for complete search history.

(56) References Cited

U.S. PATENT DOCUMENTS

| | | | |
|---|---|---|---|
| 9,520,036 B1* | 12/2016 | Buuck | G08B 6/00 |
| 9,711,015 B2* | 7/2017 | Saboune | G08B 6/00 |
| 2006/0129719 A1* | 6/2006 | Cruz-Hernandez | G08B 6/00 710/58 |
| 2009/0096632 A1 | 4/2009 | Ullrich | |
| 2009/0128306 A1* | 5/2009 | Luden | G06F 3/016 340/407.1 |
| 2013/0265286 A1 | 10/2013 | Da Costa | |
| 2014/0125467 A1* | 5/2014 | Da Costa | G08B 6/00 340/407.1 |
| 2015/0154966 A1* | 6/2015 | Bharitkar | G08B 6/00 381/23 |
| 2015/0289034 A1* | 10/2015 | Engman | G09F 27/00 340/870.07 |
| 2015/0325243 A1 | 11/2015 | Grant | |
| 2015/0348558 A1 | 12/2015 | Riedmiller | |
| 2016/0196830 A1 | 7/2016 | Riedmiller | |

* cited by examiner

FIGURE 9. Frame 8 with Chebyshev coding

| DATA TYPE | DATA VALUE DID | DATA ASSIGNMENT |
|---|---|---|
| | 00h | RESERVED |
| TYPE 1 (ONE WORD ID) | 80h | PACKET MARKED FOR DELETION (SEE SECTION 6.3) |
| | 81h 83h | RESERVED |
| | 84h | RESERVED |
| | 85h 87h | RESERVED |
| | 88h | RESERVED |
| | 89h 8Bh | RESERVED |

| DATA TYPE | DATA VALUE DID | DATA ASSIGNMENT |
|---|---|---|
| TYPE 1 (ONE WORD ID) | 8Ch 9Fh | RESERVED |
| | A0h AFh | SMPTE REGISTERED |
| | B0h BEh | SMPTE REGISTERED |
| | C0h CFh | USER APPLICATION |
| | D0h DFh | SMPTE REGISTERED |
| | E0h EFh | SMPTE REGISTERED |
| | F0h FFh | SMPTE REGISTERED |

| DATA TYPE | DATA VALUE DID | DATA ASSIGNMENT |
|---|---|---|
| | 00h | RESERVED |
| TYPE 2 (TWO WORD ID) | 01h 03h | RESERVED |
| | 04h 0Fh | RESERVED FOR 8-BIT APPLICATION (SEE 6.1) |
| | 10h 1Fh | SMPTE REGISTERED EXTERNAL ENTITY SPACE (SEE 6.1) |
| | 20h 3Fh | RESERVED |
| | 40h 4Fh | SMPTE REGISTERED |
| | 50h 5Fh | USER APPLICATIONS (SEE 6.1) |
| | 60h 7Fh | SMPTE REGISTERED |

| DATA TYPE | DATA VALUE SDID | DATA ASSIGNMENT |
|---|---|---|
| | 00h | RESERVED |
| TYPE 2 (TWO WORD ID) | 01h ... FFh | USED BY SPECIFIC APPLICATION |

FIG. 12

LOW BIT RATE PARAMETRIC ENCODING AND TRANSPORT OF HAPTIC-TACTILE SIGNALS

CROSS-REFERENCE TO RELATED APPLICATION

The present application claims the benefit of U.S. Provisional Application Nos. 62/201,185, filed Aug. 5, 2015; 62/222,100, filed Sep. 22, 2015; and 62/303,281, filed Mar. 3, 2016; this application also claims priority to European Patent Application No. 15193236.5, filed Nov. 5, 2015, all of which are hereby incorporated by references in their entirety.

TECHNICAL FIELD

The present application relates to signal processing. More specifically, the example embodiment(s) of the present invention described below relate to low bit rate parametric encoding and transport of haptic-tactile signals.

BACKGROUND

Analog and digital haptic-tactile signals can be generated in various different ways. An electro-mechanical sensor, such as a vibro-tactile sensor, a pressure sensor, or other pressure, vibration, or motion sensor, is one mechanism for generating a haptic-tactile signal. A haptic-tactile signal can also be generated synthetically using an authoring tool. An electro-mechanical actuator, from a 1-Degree of Freedom (DOF) (linear motion) to a 4-DOF actuator, may be used to playback a haptic-tactile signal. For example, a vibration or inertial sensor mounted on the seat of a professional race car driver or a sensor affixed to the boundary of a professional ice hockey rink may generate haptic-tactile signals that are delivered to an actuator mounted in a chair in a spectator's living room. The signals may be delivered to the actuator in conjunction with a live television broadcast of the race or hockey game. For example, the haptic-tactile signals might cause the actuator to vibrate the spectator's chair during the race or when players collide with the ice hockey rink boundary or in sync with vibration from an inertial sensor (or accelerometer) proximal to a race-car driver car seat. As another example, haptic-tactile signals can be collected from boxing gloves or Radio Frequency Identification (RFID) tags affixed to football players and delivered to the home or a portable device. Other applications of haptic-tactile signals exist in robotics, telepresence, medical, and military fields.

One technical challenge involving haptic-tactile signals is encoding such signals in a way that allows efficient delivery of the signals through production to emission and from emission to consumer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 12 are tables showing possible Type 1 Data Identifier values and possible Type 2 Data Identifier values as defined in Society of Motion Picture and Television Engineers (SMPTE) standard 291-2011.

DESCRIPTION OF THE EXAMPLE EMBODIMENT(S)

Figure 1:
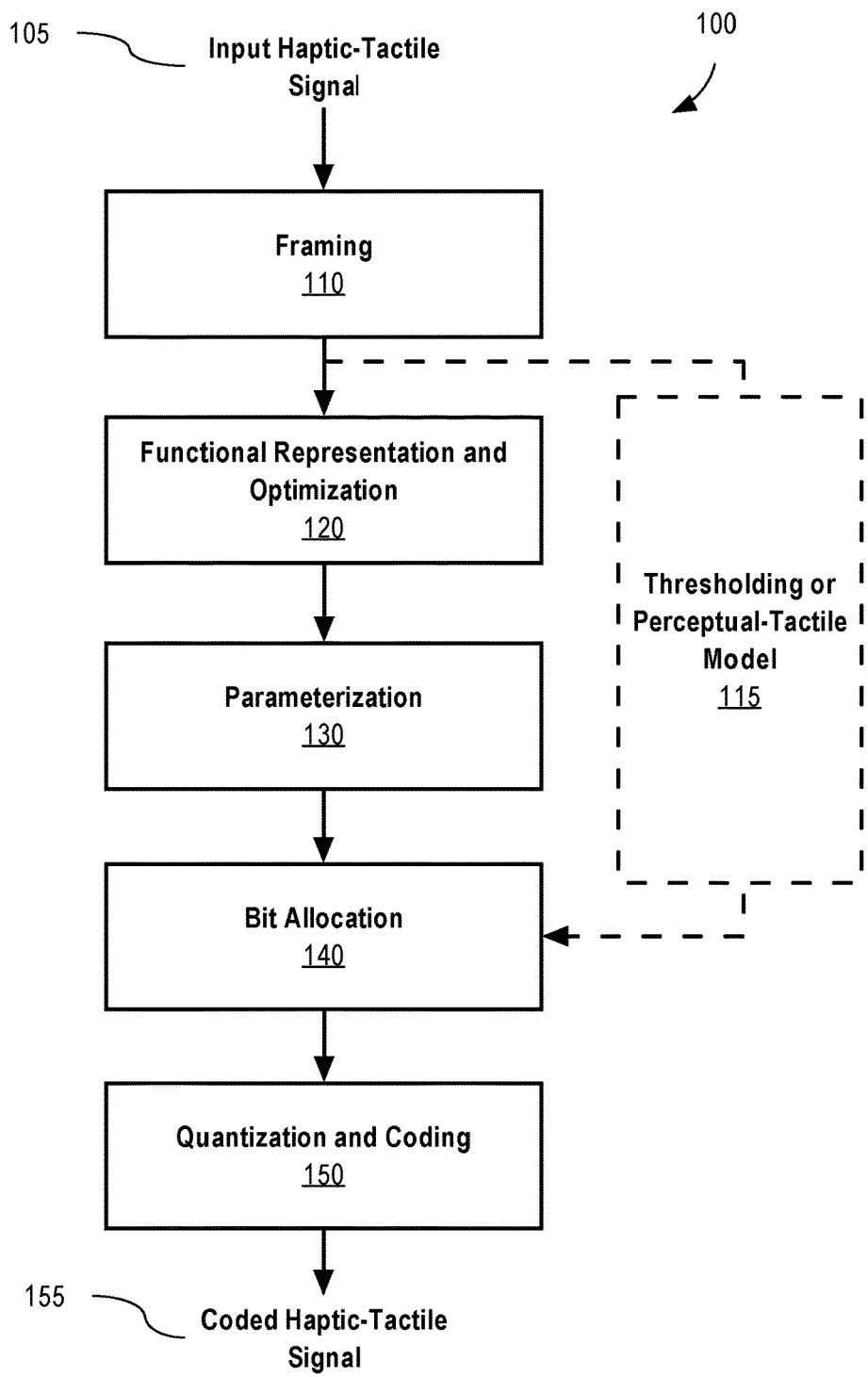
FIG. 1 illustrates a low bit rate parametric encoding process, according to some example embodiments of the present invention.

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

Overview

Example embodiments of techniques for low bit rate parametric encoding and transport of haptic-tactile signals are described.

As used herein, a "haptic-tactile signal" refers to an analog electrical signal or a digital signal (representing a bit stream or other sequence of discrete values) that represents haptic or tactile interaction, for example actual (sensed) or simulated (authored) haptic or tactile interaction, with the physical environment. In some example embodiments, a haptic-tactile signal is generated by an electro-mechanical sensor that detects physical pressure, vibration, motion, and/or acceleration. As one non-limiting example, a sensor that generates a haptic-tactile signal for use in a sporting event arena may have a dynamic range of over 100 decibels (dB) with a sample rate of 800 hertz (Hz) through 48 kilohertz (kHz).

In some example embodiments, a haptic-tactile signal is synthetic. For example, a media post-production studio may use a computerized authoring tool to create a haptic track (a type of haptic-tactile signal) for an e-media device such as a tablet computer.

As used herein, the term "haptic-tactile signal" encompasses, but is not limited to, a haptic-tactile signal that is composed of or is a mixture of multiple signals. For example, a haptic-tactile signal may be composed of signals from multiple sensors (e.g., a multi-channel haptic-tactile signal). As another example, a haptic track authoring tool may be used by a user to control the frequency and amplitude of a number of signals (e.g., sinusoids, sawtooth, impulsive, or other types of signals) to derive an overall haptic track.

According to some example embodiments, the techniques for low-bitrate parametric encoding of a haptic-tactile signal include a step in which a functional representation is used to represent the haptic-tactile signal. In some example embodiments, the technique includes a step of performing an expansion of the haptic-tactile signal in terms of functionals of the functional representation. This may include deriving the expansion coefficients of the expansion as a set of parameters for representing the haptic-tactile signal. In some example embodiments, the functional representation is based on one of a set of orthogonal functionals (e.g., orthogonal polynomials), or polynomial approximation. The orthogonal functionals may be Hermite functionals (Hermite polynomials), Laguerre functionals (Laguerre polynomials), Jacobi functionals (Jacobi polynomials), Gegenbauer functionals (Gegenbauer polynomials), Legendre functionals (Legendre polynomials), or Chebyshev functionals (Chebyshev polynomials). The set of orthogonal functionals may include the orthogonal functionals up to a given order n. In some example embodiments, the functional representation is based on Chebyshev polynomials of the first or the second kind. In some example embodiments, the functional representation is based on polynomial approximation. That is, the set of orthogonal functionals may be one of Chebyshev functionals of the first kind or Chebyshev functionals of the second kind. In other words, the functional representation may be based on one of Chebyshev functionals of the first kind through order n, Chebyshev functionals of the second kind through order n, or k-th order polynomial approximation. In some example embodiments, the functional representation is based on Linear Predictive Coding (LPC) modeling. The functional representation used aims to be low-complexity and low-latency for real-time broadcast and media applications while achieving a good waveform match such that the error between decoded signal and the source signal is small. Further, by using parametric encoding, the parameters of the encoded haptic-tactile signal are readily mapped to parametric data (e.g., metadata) for carriage in a compressed audio bit stream such as, for example, a Dolby AC-3, E-AC3, AC-4 bitstream, a MPEG-H Part 3 MHAS bitstream, or in MPEG2, or MPEG4 container. The parameters of the encoded haptic-tactile signal may be suitable for rebuilding the source haptic-tactile signal from these parameters, e.g., by a decoder.

These and other example embodiments of the present invention will now be described with reference to the figures.

Example Low-bitrate Parametric Encoding Process

Turning first to FIG. 1, it illustrates a parametric encoding process 100 for low bit rate parametric encoding of a source haptic-tactile signal 105, according to some example embodiments of the present invention. The process 100 accepts as an input a digital haptic-tactile signal 105, which may have a bit rate of up to several Megabits per second (Mbps). For example, at 48 kHz sample rate and 24 bit bit-depth, a single sensor could yield a raw data-rate of approximately 1.15 Mbps. Therefore, the relatively high data-rate of the source haptic-tactile signal 105 may not be amenable for efficient transport during production or from emission to consumer, either by terrestrial, cable, or Internet transport.

The process 100 codes the source haptic-tactile signal 105 into a format 155 amenable for insertion into an audio codec bitstream. The source haptic-tactile signal 105 is coded at a reduced bitrate, thereby allowing efficient delivery of the coded haptic-tactile signal 155 through production to emission and from emission to consumer. The process 100 includes a number of steps 110, 120, 130, 140, and 150, including an optional thresholding or perceptual-tactile modeling step 115.

The process 100 may be performed by a parametric encoder. The parametric encoder may use a functional representation of the source haptic-tactile signal 105 to create parameters, and then code the parameters. The parametric encoder may be implemented in hardware, software, or a combination of hardware and software. At a high level, the parametric encoder represents the source haptic-signal signal 105 with parameters which are then coded into a format (coded haptic-tactile signal 155). A corresponding parametric decoder can rebuild the source haptic-tactile signal 105 from the coded parameters 155. In some example embodiments, the parameters that are used to describe the source haptic-tactile signal 105 in a frame include all of the following parameters, or a subset or a super set thereof: center frequency, gain, and decay rate.

In step 110, the source haptic-tactile signal 105 is analyzed in an appropriate frame length. For example, an analysis frame could be over a 32 millisecond window. Such a window translates to 1536 samples of the source haptic-tactile signal at 48 kHz.

Once a frame is identified at step 110 (the current frame), steps 120, 130, 140, and 150, and optionally step 115, may be performed for the current frame.

In step 120, a functional representation and an optimization process are used to generate parameters for the current frame. The parameters generated for the current frame model the haptic-tactile signal 105 in the current frame. The parameters generated for the current frame may be the coefficients (e.g., expansion coefficients) of the modeled signal (e.g., of an approximation of the signal) for respective functionals of the functional representation. In other words, the parameters generated for the current frame may be the expansion coefficients, up to a given order, of an expansion of the haptic-tactile signal according to the functional representation. At least three different alternative functional representations are contemplated including (1) orthogonal functionals, such as Chebyshev functionals (e.g., Chebyshev polynomials), (2) polynomial approximation, and (3) LPC modeling. In addition, a thresholding scheme may be used in the side-chain to prevent unnecessary coding of noise which may be present in the source haptic-tactile signal 105.

Chebyshev Functionals

In some example embodiments, Chebyshev functionals (e.g., Chebyshev functionals of order n) are used as the functional representation in step 120. The Chebyshev functionals can be of the first kind. Alternatively, the Chebyshev functionals can be of the second kind. In some example embodiments, the Chebyshev functionals of order n of the first kind are represented by the following recursion over the domain $x \in [-1,1]$:

$T_0(x)=1$ $T_1(x)=x$ $T_n(x)=2xT_{n-1}(x)-T_{n-2}(x)$

Figure 2:
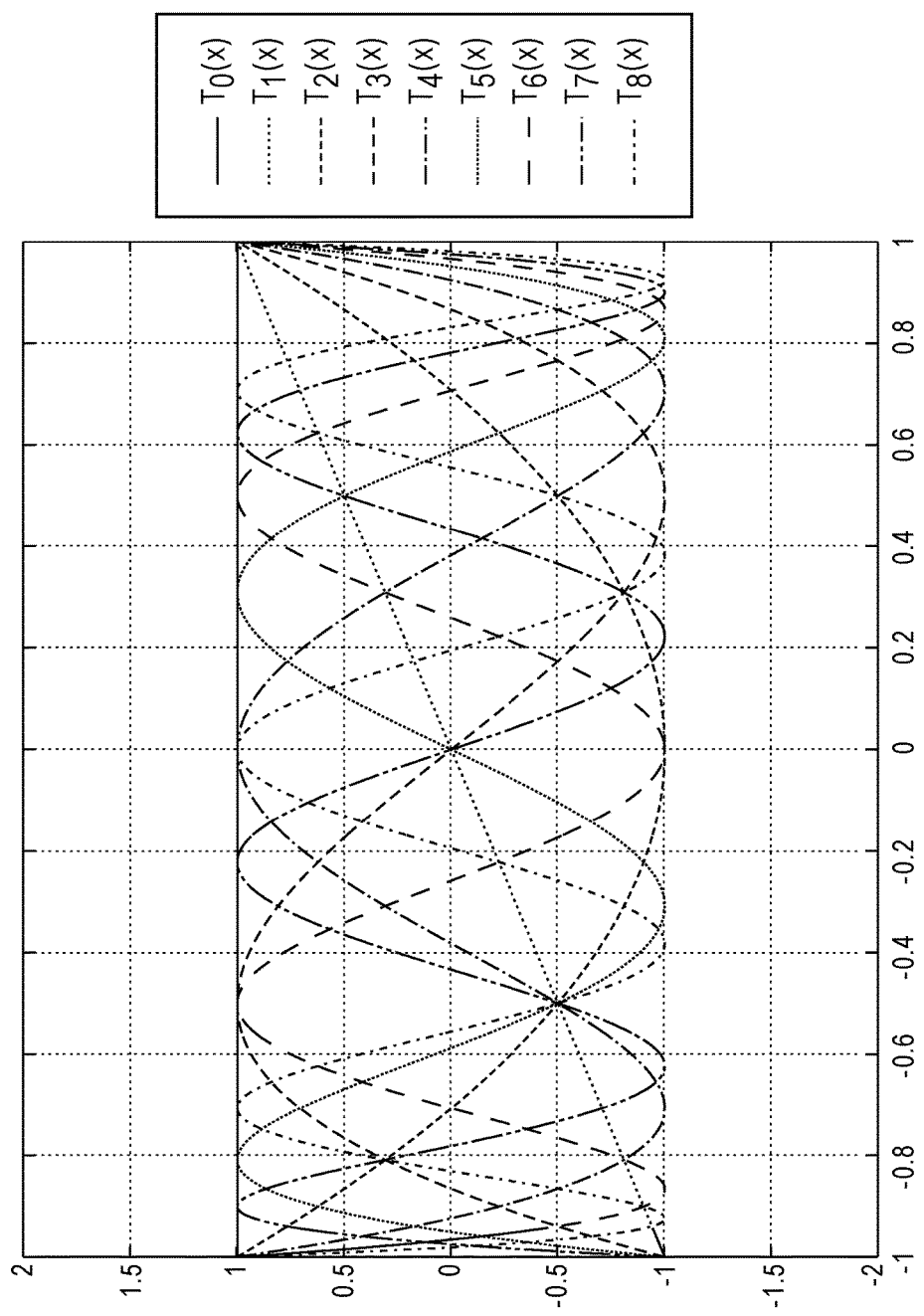
FIG. 2 plots Chebyshev functionals of the first kind through order 8, according to some example embodiments of the present invention.

Turning briefly to FIG. 2, it plots the above Chebyshev functionals of the first kind through order 8.

In some example embodiments, the Chebyshev functionals of order n of the second kind are represented by the following recursion over the domain $x \in [-1,1]$:

$U_0(x)=1$ $U_1(x)=2x$ $U_n(x)=2xT_{n-1}(x)-T_{n-2}(x)$

Figure 3:
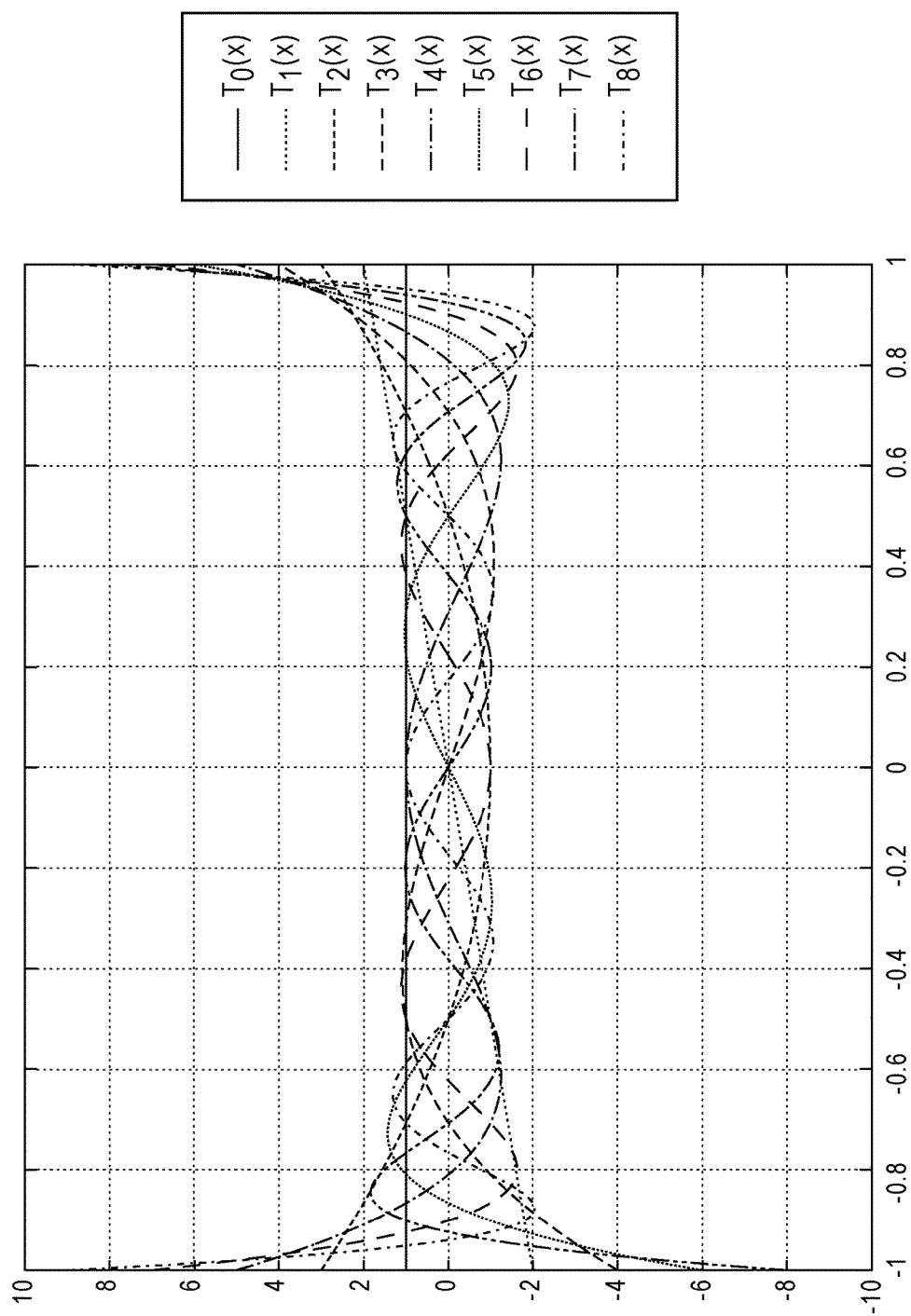
FIG. 3 plots Chebyshev functionals of the second kind through order 8, according to some example embodiments of the present invention.

FIG. 3 plots the above Chebyshev functional of the second kind through order 8.

In some example embodiments, whether the above Chebyshev functionals of the first kind or the above Chebyshev functionals of the second kind are used, the coefficient (parameter) vector, $\underline{b}_{(n+1)\times 1}$ (e.g., $\underline{b}_{9\times 1}$), to be coded is obtained using a least-squares formulation by pseudo inversion of the Mx(n+1) (e.g., 1536×9) Chebyshev functional matrix $T_{Mx(n+1)}$ (e.g., $T_{1536\times 9}$), where M is the number of samples in the analysis window (e.g., analysis frame) and Chebyshev functionals through order n are used, and premultiplying the result with the source waveform $\underline{y}_{M\times 1}$ (e.g., $\underline{y}_{1536\times 1}$) using the matrix $(T^H T)^{-1} T^H$ as represented by:

$\underline{b}=(T^H T)^{-1} T^H \underline{y}$

In some example embodiments, the approximation of the source waveform by the Chebyshev functionals through order n is given by $$\hat{y}(x) = \sum_{i=0}^{n} b_i T_i(x)$$

for Chebyshev functionals of the first kind, and by $$\hat{y}(x) = \sum_{i=0}^{n} b_i U_i(x)$$

for Chebyshev functionals of the second kind, and $\underline{b}$ is given by $\underline{b}=(b_0, \ldots, b_n)^T$ The number of parameters coded is 9 in this example (e.g., n+1). However, depending on the perceptual model (masking model) in the side-chain, a lower order representation (viz., less than 9 parameters or less number of bits) may be used in other example embodiments. In some example embodiments, the superscript H in the above matrix $(T^H T)^{-1} T^H$ represents a Hermitian operator. In the case of real-signals, as opposed to complex signals denoted by the real and imaginary part), the Hermitian operator is a transpose operator.

In some example embodiments, a pseudo inversion is performed for the current frame. In some example embodiments, the matrix $(T^H T)^{-1} T^H$ is stored in the parametric encoder and applied to the source signal 105 in the current frame, as opposed to performing a pseudo inversion on the current frame, thereby lowering complexity and encoding latency.

In some example embodiments, where one of the above Chebyshev functionals are used to represent the source signal 105 in the current frame, optimization involves analyzing the best fit between the above Chebyshev functionals of the first kind with order n and the source signal in the current frame. In some example embodiments, optimization involves analyzing the best fit between the above Chebyshev functionals of the second kind with order n and the source signal in the current frame.

Whether first or second kind Chebyshev functions are used, the best fit may be in the form of an unweighted mean square error. For example, the optimization process could look for the best fit according to an unweighted mean-square error between the source signal in the current frame and a parametric reconstruction over the current frame. This best fit analysis could be done by optimizing over the order n and either the above Chebyshev functionals of the first kind or the above Chebyshev functionals of the second kind.

Polynomial Approximation

In some example embodiments, a k-th order polynomial is used as the functional representation of the source signal in the current frame. In some example embodiments, the k-th order polynomial is represented by:

$$\hat{y}(x) = \sum_{i=0}^{k-1} a_i \, x^i$$

The residual error in the approximation of $y_{x_p}$ at $p=\{1, 2, \ldots, P\}$ points is represented by:

$$R^2 = \sum_{p=1}^{P} (y(x_p) - \hat{y}(x_p))^2$$

$$= \sum_{p=1}^{P} \left( y(x_p) - \left[ \sum_{i=0}^{k-1} a_i x_p^i \right] \right)^2$$

In some example embodiments, the number of points P is 1536 (viz., frame duration M in units of samples).

In some example embodiments, minimization of $R^2$ over the parameter set $\{a_i\}$ involves obtaining the partials $\partial R^2 / \partial a_i$, $\forall i$. Then, a solution comprising the parameter set $\{a_i\}$ may be obtained by inverting the Vandermonde matrix V, where:

$$V = \begin{pmatrix} 1 & x_1 & \dots x_1^k \\ 1 & x_2 & \dots x_2^k \\ \dots & \dots & \dots \\ 1 & x_p & \dots x_P^k \end{pmatrix}$$

and, $$\underline{a} = (V^H V)^{-1} V^H \underline{y}$$

where $$a = (a_0, \dots, a_{k-1})^T$$

In some example embodiments, conditioning of the domain $x_p$ is performed before pseudo inversion to achieve a more stable solution. In some example embodiments, conditioning includes centering and/or scaling of the domain $x_p$.

In some example embodiments, where polynomial approximation is used as the functional representation, optimization involves a best fit analysis over polynomials of order k such that $k \in \{1, N\}$, where N is the preset upper-limit for best-fit analysis.

Linear Predictive Coding (lpc) Modeling

In some example embodiments, linear predictive modeling is used as the functional representation of the haptic-tactile signal 105 at step 120. In some example embodiments where LPC modeling is used, a non-uniform DFT is used in the parametric encoder to provide better resolution at low frequencies, than would be provided by a DFT that samples the haptic-signal 105 at even intervals. The non-uniform DFT can be achieved through warping with cascade of all-pass filters. In this case, the warping coefficient and the all-pole parameters could be quantized using a standard codec such as, for example, Mu-Law or other companding algorithm. Alternatively, the non-uniform DFT can be achieved through vector quantization. The order of the LPC k can be preselected or a best-fit least squares analysis may be performed to find the $k \in \{1, N\}$.

Parameterization

Regardless of the functional representation and optimization process used at step 120, following parameterization at step 130 which generates the output parameters b either through Chebyshev or polynomial representation, in some example embodiments, a Mu-Law quantization scheme is applied to the output parameters where the output parameters are uniformly quantized using rounding to the nearest level and a saturation limiter. As an alternative to rounding, uniform quantization may be achieved by 2's complement truncation or magnitude truncation. As an alternative to using a saturation limiter, no limiter, a triangle limiter, or a 2's complement overflow may be used.

Bit-allocation

In step 140, a determination is made if the source signal 105 in the current frame is below a certain threshold as determined by noise amplitude analysis over the frame where the likelihood of a haptic-tactile signal being present is low (e.g., in the first 10-15 milliseconds of the first 32 millisecond frame). The threshold may be the maximum absolute amplitude or an RMS value over the frame, and in some example embodiments, this determination is made by evaluating the standard deviation against a low threshold. If the current frame signal values are below the threshold, then reduced bits or no bit allocation is done in the frame in the following step of quantization and coding.

Quantization and Coding

At step 150, the current frame is quantized and coded. In some example embodiments, parameters (coefficients) in each frame are Mu-Law quantized and coded uniformly with the number of bits being equal to N/m, where m is the number of parameters (coefficients) and N is a total bit-pool selected to keep the bit-rate low. For example, where there are m=9 parameters (coefficients), the bit-pool N might be selected at 180 bits such that each parameter (coefficient) is quantized and coded with 20 bits resulting in a bit-rate for the output haptic-tactile signal 155 of approximately 5.5 kilobits per second (kbps) over the 32 ms frame.

Use of the companding function preserves the dynamic range of the input haptic-tactical signal 105 at low amplitudes. In some example embodiments, the Mu-Law companding function is represented by:

$$f(x) = \text{sgn}(x) \frac{(\log(1 + \mu |x|))}{(\log(1 + \mu))}$$

At the decoder, an inverse (expanding) function may be used to recover the source haptic-tactile signal 105. In some example embodiments, the expanding function is represented by:

$$g(x) = \text{sgn}(x) \frac{((\mu + 1)^{|x|} - 1)}{\mu}$$

In both the companding and expanding functions, sgn(x) represents the standard signum-function. The parameter $\mu$ of the function may be set based on numerical optimization. For example, $\mu$ may be between 0 and 255 (in the examples the value of 144 was used). In some example embodiments, parameter $\mu$ is adapted based on a side chain statistical analysis (to get the dynamic range variations) on a frame-by-frame basis or over multiple frames. In this case, the parametric encoder would need also to map $\mu$ to a bit-representation for inclusion in the output haptic-tactile signal 155.

Perceptual Model and Thresholding

In some example embodiments, as represented by step 115, a perceptual data model is incorporated into the process 100 to further reduce the bit rate of the coded haptic-tactile signal 155. For example, a perceptual data model may be used to reduce the bit rate from approximately 5.5 kbps to approximately 2 to 3 kbps while still retaining an acceptable match between the source waveforms of the source haptic-tactile signal 105 and the decoded waveforms of the coded haptic-tactile signal 155.

In some example embodiments, a vibro-tactile perception model is used for perceptual bit-allocation at step 140. For example, the vibro-tactile perception model could involve joint audio-tactile analysis during bit-allocation (step 140). In addition or alternatively, if the input haptic-tactile signal 105 is composed of multiple signals from multiple sensors, then joint coding of the input haptic-tactile signal 105 could be employed by identifying correlations between the multiple signals.

In some example embodiments, as an alternative to using a perceptual model at step 115, a thresholding scheme is used as explained earlier.

Comparison of Encoding Approaches

According to some of the example embodiments, process 100 provides comparable results when either a Chebyshev functionals or the polynomial approximation functional representation is used at step 120 and Mu-Law coding is used at the quantization and coding step 150. However, in some scenarios, the Chebyshev functionals functional representation and Mu-Law coding provides a better match between source and decoded waveforms at decoded frame boundaries.

Figure 4:
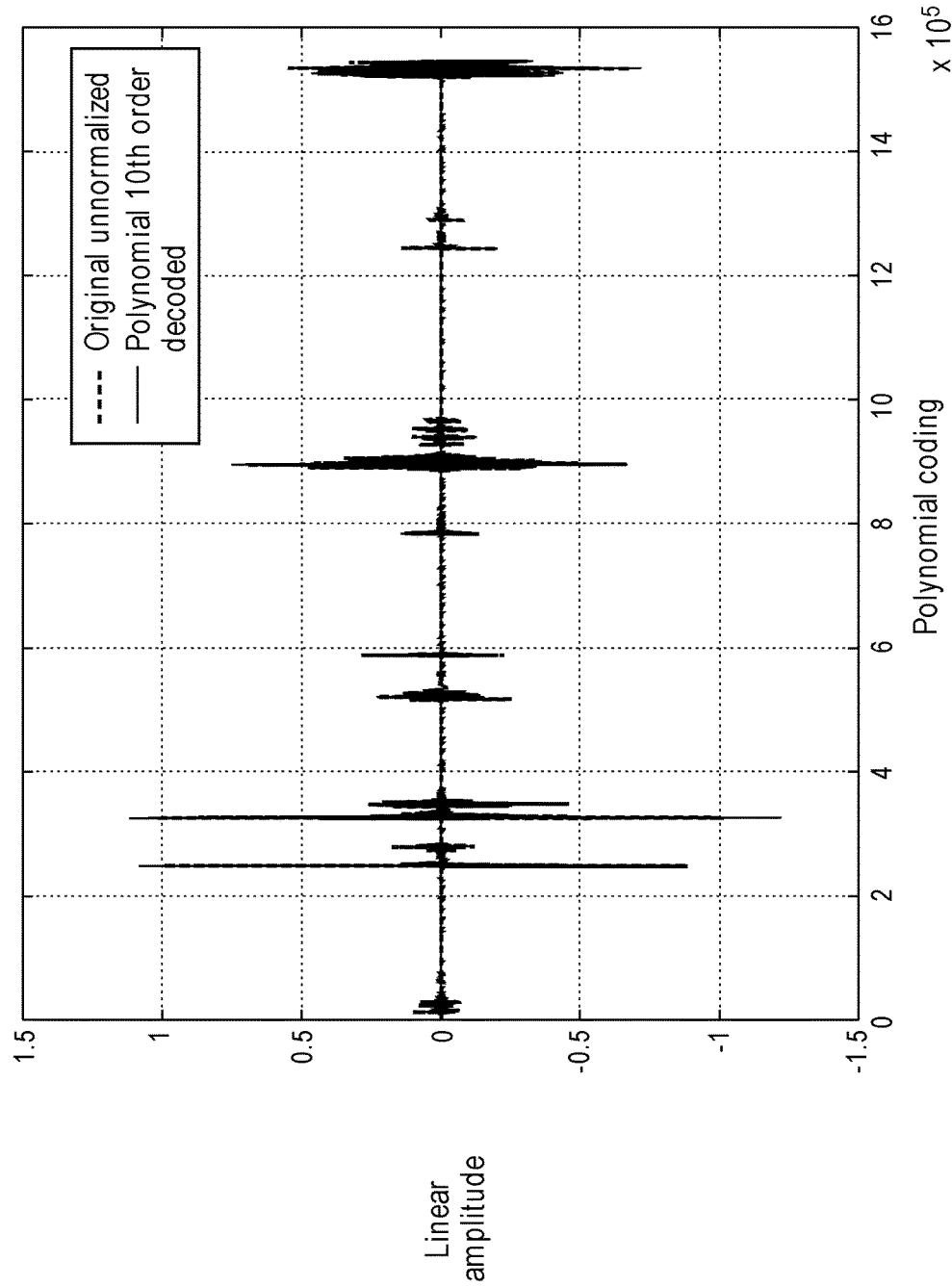
FIG. 4 plots a waveform of a decoded haptic-tactile signal and a waveform of a source haptic-tactile signal, according to some example embodiments of the present invention.

FIG. 4 shows the results from using the $10^{th}$-order polynomial approximation as the functional representation, according to some example embodiments. In particular, FIG. 4 plots the discrete sample number of the signal (along X-axis), and the amplitude values of the decoded signal (Y-axis) in a 32 millisecond frame of a coded haptic-tactile signal 155 as well as the source signal amplitude values in the corresponding frame of an input haptic-tactile signal 105. As can be seen in FIG. 4, the plot of the decoded signal almost completely matches the plot of the source signal, which demonstrates that using the $10^{th}$-order polynomial approximation functional representation can achieve a good waveform match between the decoded signal and the source signal with small error. In this example, the input haptic-tactile signal 105 was sampled at a rate of 48 kHz and at 24 bits per sample. The frame length was 32 milliseconds. 12 parameters (coefficients) ($11^{th}$-order) were used along with 180 bits in the bit-pool over the 32 millisecond frame to achieve a coded bit rate of approximately 5 kbps. Further, the compression ratio between the source signal and the coded signal in this example is approximately 230.

Figure 5:
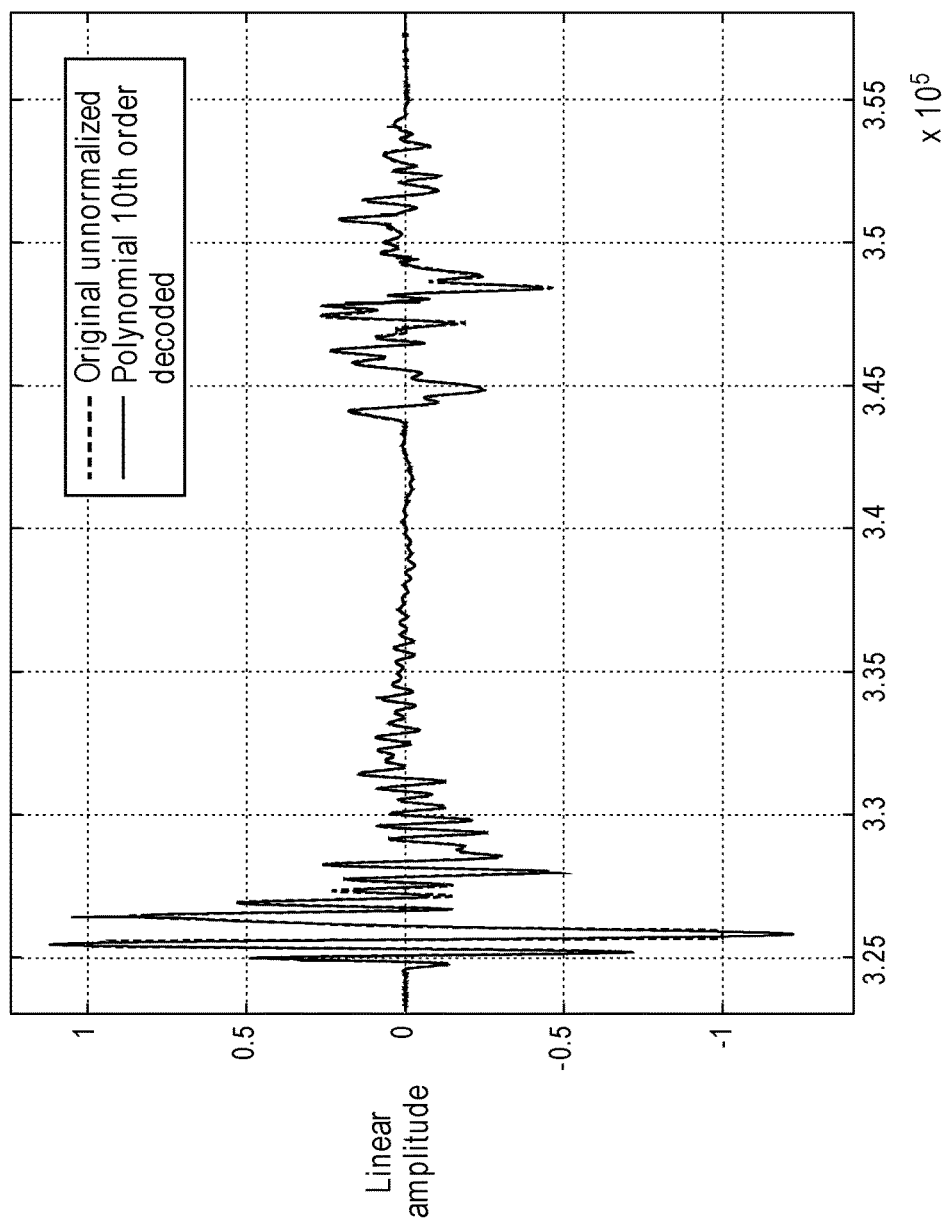
FIG. 5, FIG. 6, and FIG. 7 each show a section of the waveform plots of FIG. 4 in greater detail, according to some example embodiments of the present invention.
Figure 6:
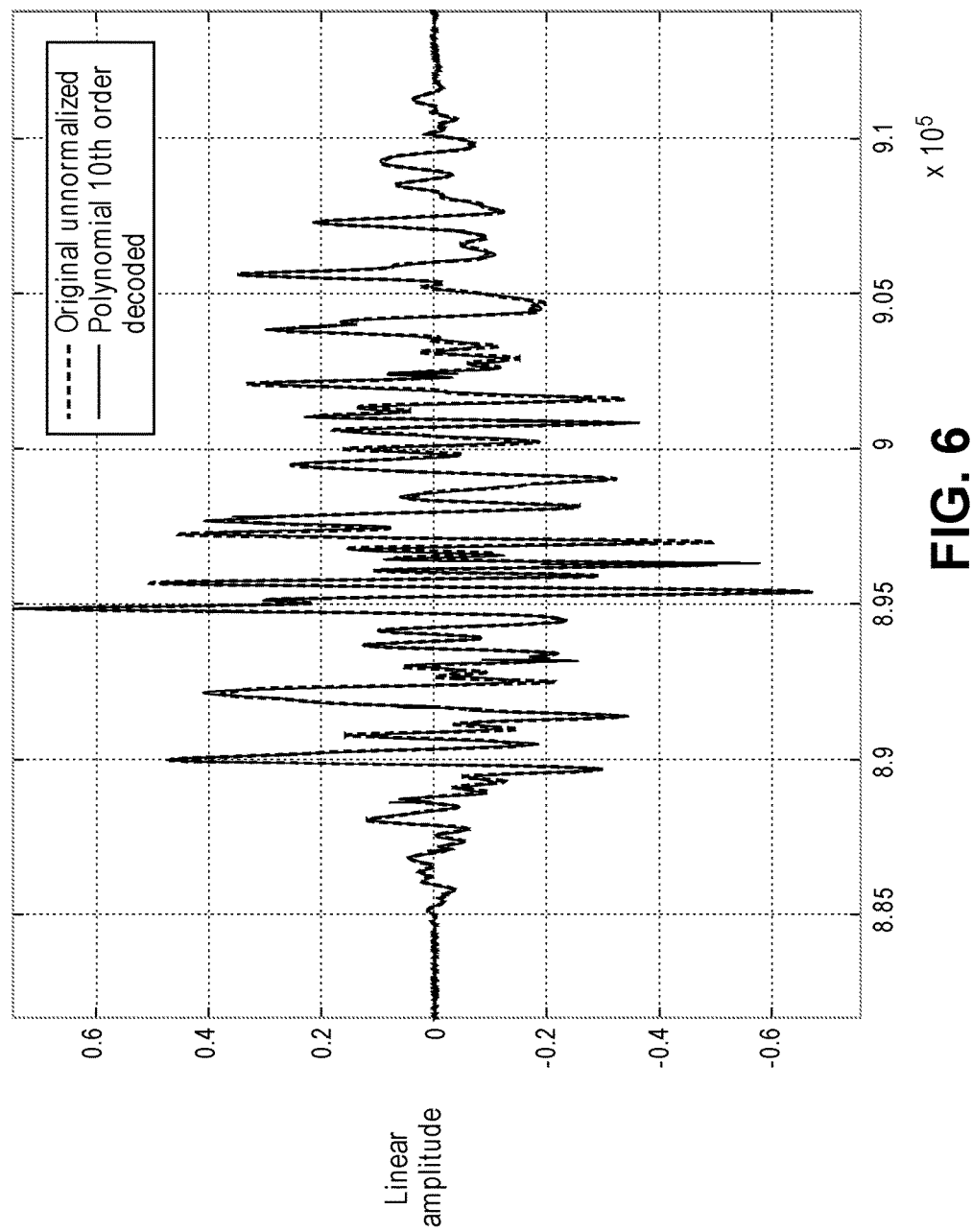
Figure 7:
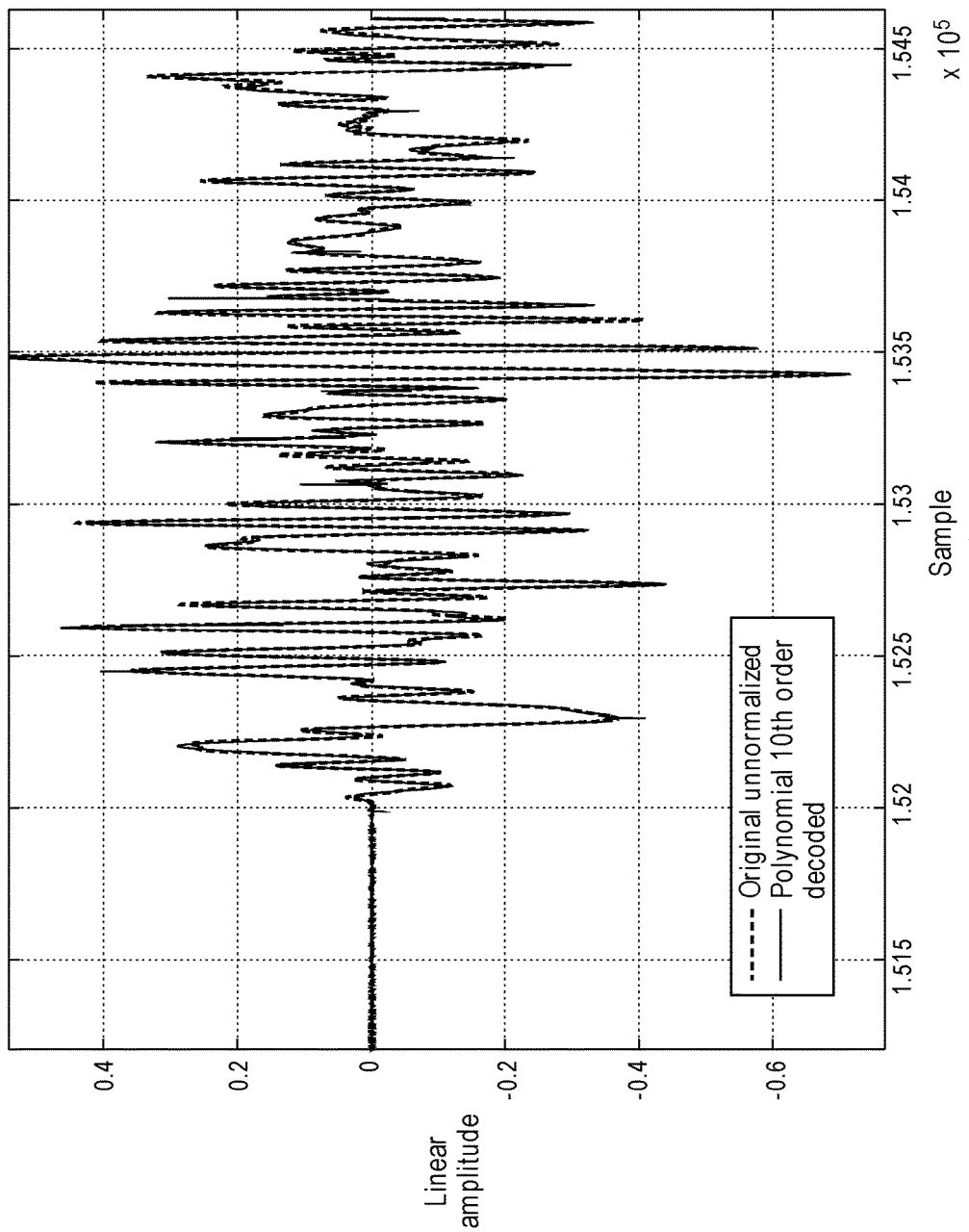

FIG. 5, FIG. 6, and FIG. 7 show various sections of the plots of FIG. 4 in greater detail, according to some example embodiments of the present invention. As can be seen from each of the FIGS. 5, 6, and 7, the waveform of the decoded signal in the corresponding section closely matches the waveform of the source signal in the section. Thus, an even lower bit-rate is possible (e.g., 2 to 3 kbps) while still achieving close waveform matching between the decoded and source signals. For example, a higher compression ratio may be achieved by incorporating masking thresholds and/or by incorporating sensitivity of tactile sensations that are a function of the position of the tactile simulation on the body.

Figure 8:
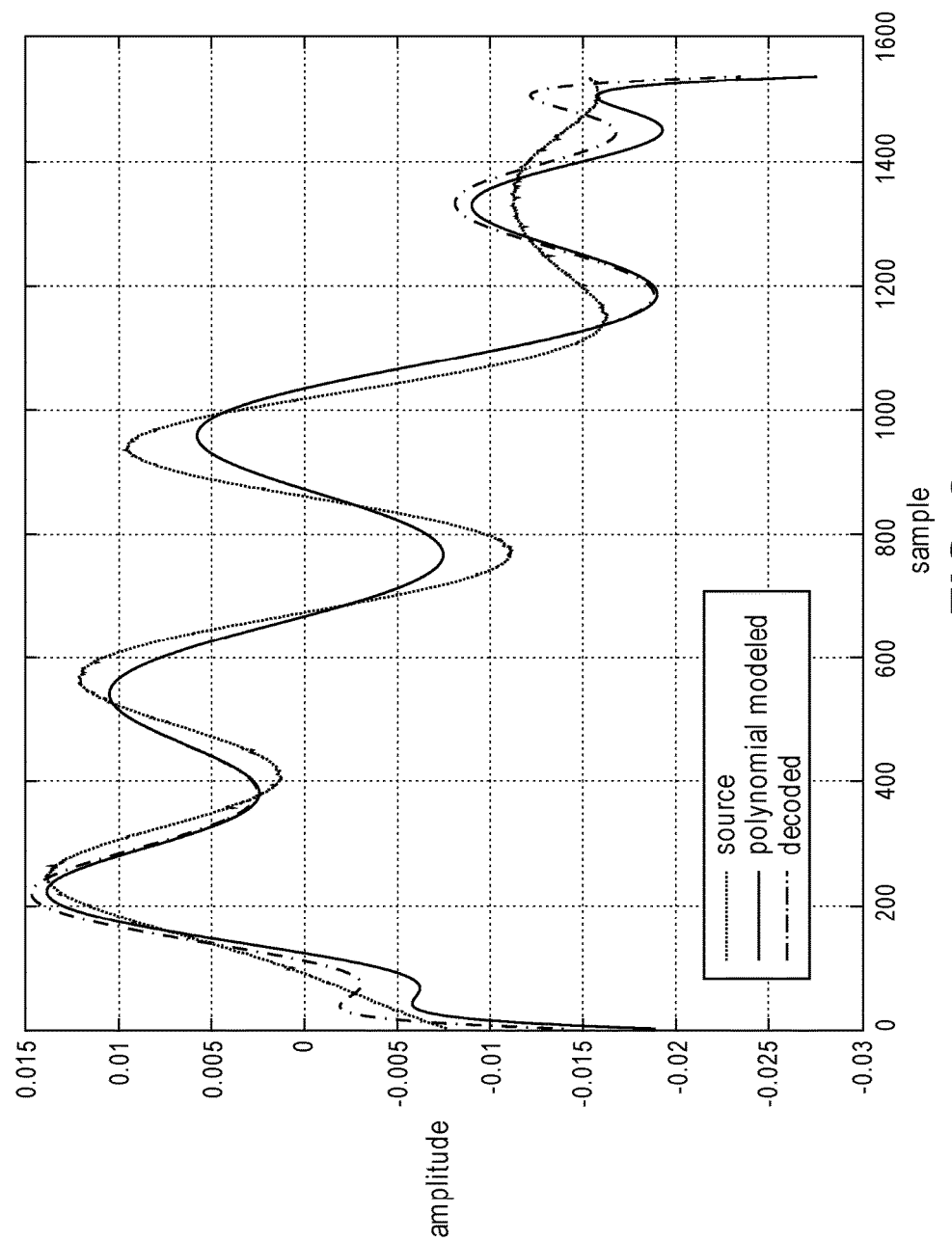
FIG. 8 plots a waveform of a decoded haptic-tactile signal, plots a waveform of a source haptic-tactile signal, and plots a waveform of the source signal as modeled by an $8^{th}$-order polynomial approximation functional representation, according to some example embodiments of the present invention.

FIG. 8 plots the waveform of a decoded signal from a frame of a coded haptic-tactile signal 155 coded using process 100 where the $8^{th}$-order polynomial approximation functional representation is used at step 120 to represent a source signal of the corresponding frame of the source haptic-tactile signal 105 and Mu-Law coding is used at step 150 to code the frame parameters, according to some example embodiments of the present invention. A mismatch between the decoded signal and the source signal as modeled by the $8^{th}$-order polynomial approximation functional representation can be seen at the frame's boundaries (e.g., between sample 0 and approximately sample 300 and between approximately sample 1,300 and approximately sample 1,600).

Figure 9:
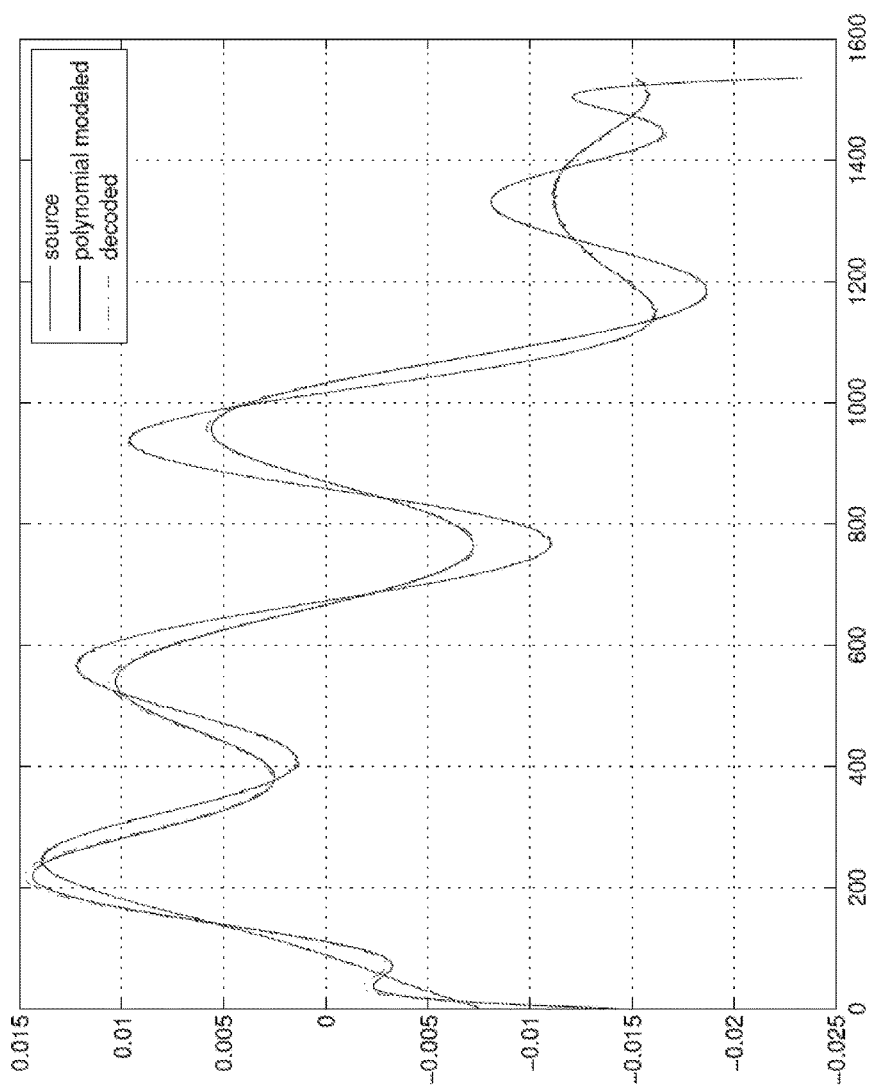
FIG. 9 plots a waveform of a decoded haptic-tactile signal, plots a waveform of a source haptic-tactile signal, and plots a waveform of the source signal as modeled by Chebyshev functionals of order 8, according to some example embodiments of the present invention.

For comparison, FIG. 9 plots a decoded signal from a frame of a coded haptic-tactile signal 155 corresponding to the frame of FIG. 8 coded using process 100 but coded using the Chebyshev functionals functional representation of the first kind of order 8 at step 120 (instead of the $8^{th}$-order polynomial approximation functional representation) and Mu-Law coding at step 150, according to some example embodiments of the present invention. As can been from the plot of FIG. 9, the Chebyshev functionals provide a better match between the decoded signal and the modeled signal at frame boundaries.

Time-differential Coded Haptic-tacile Data Frames

According to some embodiments, in order to further reduce the bit rate of the coded haptic-tactile signal 155, the signal 155, or a portion (e.g., configuration parameters) thereof, is time-differential coded such that information in a given frame (N) is based on information in a prior frame (N−1), which in turn may be based on information in a prior frame (N−2), and so on. In this case, a decoder of the time-differential coded haptic-tactile signal 155 can begin deriving absolute values from frame N if the decoder also has data from the prior dependent frames (e.g., N−1, N−2, etc.) available.

If a value in a frame of the time-differential coded haptic-tactile signal 155 is relative to an absolute value in another frame, then the value is said to be a difference value. To derive (calculate) an absolute value from a difference value, the decoder must have received both the frame containing the difference value and the other frame containing the absolute value. In other words, the decoder cannot begin deriving absolute values from difference values in a frame until the decoder receives the frame or frames containing the absolute values from which the difference values are calculated. A time-differential coded haptic-tactile data frame of a time-differential coded haptic-tactile signal 155 that contains all information needed by the decoder to immediately derive absolute values from the frame is referred to herein as a "haptic-tactile data independent frame," or "haptic-tactile data I-frame." A decoder decoding a time-differential coded haptic-tactile signal 155 that contains haptic-tactile data I-frames can be begin deriving absolute values from the haptic-tactile data frames of the signal 155 at a haptic-tactile data I-frame in the signal 155.

Figure 16:
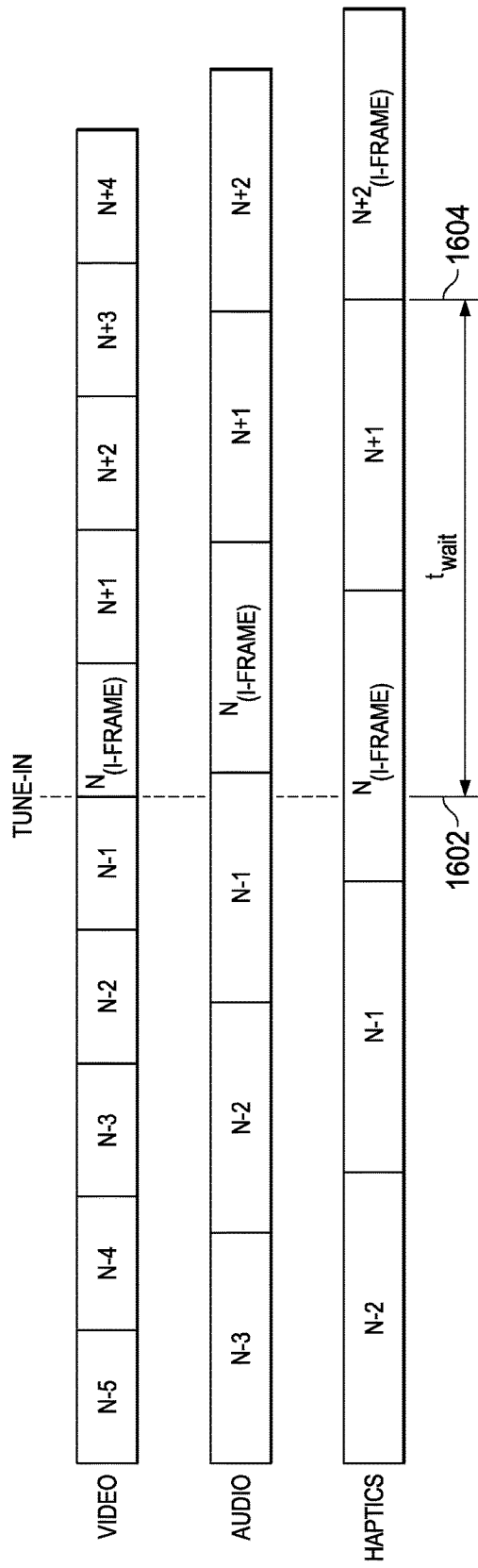
FIG. 16 is a diagram illustrating unaligned video, audio, and haptic-tactile data frames.

It can be the case that a decoder begins decoding a time-differential coded haptic-tactile signal 155 somewhere in the middle of the signal 155, for example, if the signal 155 is part of a television or other media program that is switched to or tuned-in to. In this case, the decoder may need to wait for a period of time to begin deriving absolute values from the haptic-tactile data frames of the signal 155. This wait time can be problematic if the haptic-tactile data frames of the signal 155 are not aligned with other related media frames. For example, FIG. 16 illustrates a scenario where tune-in occurs at a video I-frame border 1602 (labeled as Video frame N in FIG. 16). Media program switches often occur at video I-frame borders. However, because the haptic-tactile data frames are not aligned with the video frames, the decoder must wait until the next haptic-tactile data I-frame border 1604 (labeled as Haptics frame N+2 in FIG. 16) to begin deriving absolute values from the haptic-tactile data frames.

Figure 17:
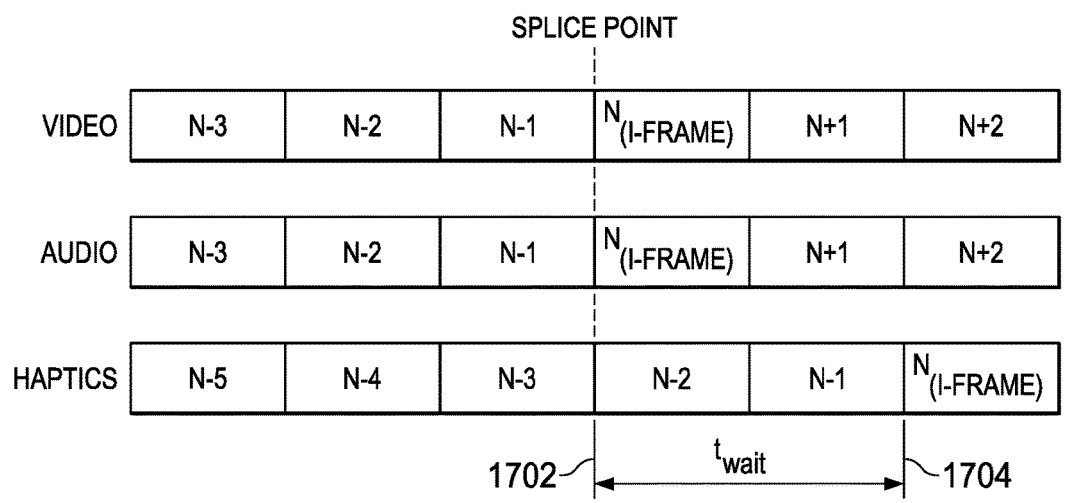
FIG. 17 is a diagram illustrating aligned video, audio, and haptic-tactile data frames.

According to some embodiments, in order to facilitate the functionality of easier splicing, cutting, ad-insertion and other functionality, a frame length may be selected in at step 110 of the encoding process 100 such that the total frame duration of each haptic-tactile data frame of the time-differential coded haptic-tactile signal 155 is equal to a related video and/or audio frame. By doing so, the haptic-tactile data frames are aligned with the related frames and all start at the same point in time of the program. However, even where the frames are aligned, the decoder may still have to wait for a period of time to begin deriving absolute values from the haptic-tactile data frames. For example, FIG. 17 illustrates a splice point 1702 at the borders of aligned video, audio, and haptic-tactile data frames labeled Video frame N, Audio frame N, and Haptics frame N−2, respectively, in FIG. 17. Nonetheless, the decoder must wait until the border 1704 of the next haptic-tactile data I-frame (Haptics frame N in FIG. 17) to begin deriving absolute values from the haptic-tactile data frames.

Figure 18:
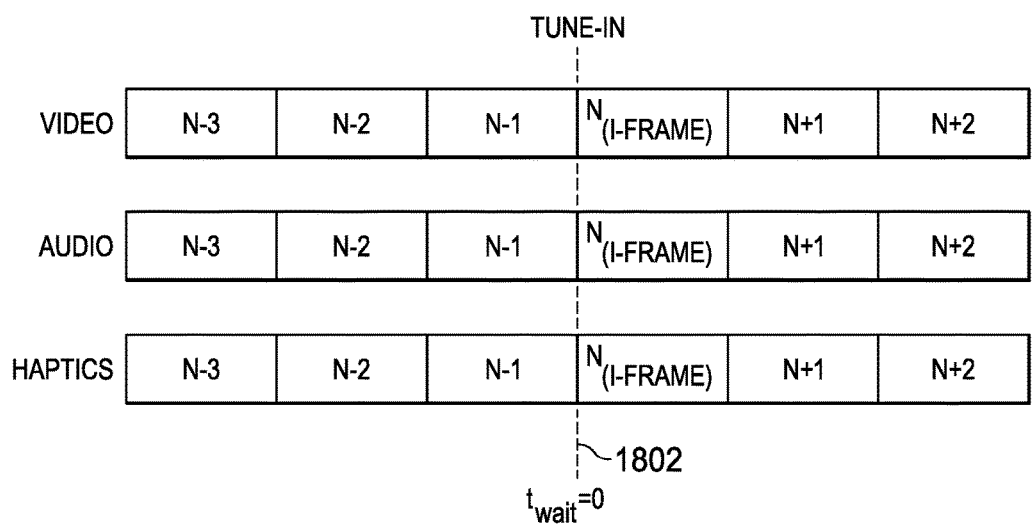
FIG. 18 is a diagram illustrating aligned video, audio, and haptic-tactile independent data frames.

According to some example embodiments, haptic-tactile data I-frames are generated at step 110 of encoding process 100 such that the time-differential coded haptic-tactile signal 155 includes haptic-tactile data I-frames that are aligned with related video and/or audio independent frames. In this way, if a media program is switched to or tuned-in to at a video I-frame border, the decoder can being immediately deriving absolute values from the corresponding haptic-tactile data I-frame. This is illustrated by an example in FIG. 18. In the scenario of FIG. 18, the tune-in 1802 occurs at the border of Video I-frame N which is aligned with audio I-frame N and Haptics I-frame N. As a result, the decoder can begin deriving absolute values from all three I-frames. Also in this scenario, the time-differential coded haptic-tactile signal 155 has a frame rate that is aligned with the video or audio frame rate. For example, the frame rate of the time-differential coded haptic-tactile signal 155 may be, for example, 23.976, 24.000, 25.000, 29.970, 30.000, 47.952, 48.000, 50.000, 59.940, 60.000, 100.000, 119.880, or 120.000 frames per second.

Transport

Various different approaches will now be described for transporting (e.g., sending or receiving) the haptic-tactile parameters encoded by the coded bit stream 155. For example, transport may include formatting the parameters of the coded bit stream 155 as haptic-tactile parameter set (as haptic essence metadata values) for carriage by a container bit stream format and sending and receiving the container bit stream format containing the haptic-tactile parameter metadata over-the-air, for example, in conjunction with a television broadcast or over one or more data networks such as, for example, the Internet.

Carriage Within Compressed Audio Bit Streams

In some example embodiments, the coded haptic-tactile bit stream 155 is mapped to essence-metadata for carriage in a compressed audio bit stream to a decoding device. In some example embodiments, the compressed audio bit stream is AC-3 or an E-AC-3 compressed audio bit stream as defined in the standards documents Advanced Television Systems Committee (ATSC) standard A/52b and European Telecommunications Standards Institute (ETSI) TS 102 366. In some example embodiments, the parameter metadata is carried in all of the following syntactical elements of an AC-3 or E-AC-3 coded bit stream, or a subset or a superset thereof:
The auxiliary data field;
The addbsi data field;
The skip field; and
The wastebit field.

In some example embodiments, the parameters of the coded haptic-tactile signal 155 represented in the parameter metadata include center frequency (Fc), quality factor (Q), and gain and the parameter metadata is carried in a dependent or an independent substream of an AC-3 or E-AC-3 coded audio bit stream. For example, the dependent or independent substream can be one defined in Annex E of ATSC A52/b.

In some example embodiments, the parameter metadata is carried within compressed audio bit stream belonging to the Motion Pictures Experts Group 2 (MPEG2), MPEG4, or MPEG-H family of compressed audio bit streams. The MPEG2, MPEG4, and MPEG-H audio family is described in the standards documents ISO/IEC 14496-3, ISO/IEC 13818-3, and ISO/IEC 23008-3. In some example embodiments, the parameter metadata is carried within all of the following syntactical elements of an MPEG2, MPEG 4, or MPEG-H compressed audio bit stream, or a subset or a superset thereof:
data_stream (DSE);
fil (FIL) elements; and
MHAS Packet with MHASPacketType of PACTYP_SYSMETA.

In some example embodiments, the parameter metadata is packaged in an extensible metadata container (e.g., container 1000 described below) before the metadata container containing parameter metadata is inserted into data_stream (DSE) and/or fil (FIL) syntactic elements of an MPEG2 or MPEG4 compressed audio bit stream, or into an MPEG-H Part 3 MHAS Packet with MHASPacketType of PACTYP_SYSMETA.

Carriage with an Extensible Metadata Container

In some example embodiments, the parameter metadata is carried in a secure and extensible metadata container. In some example embodiments, the container carrying the parameter metadata set is inserted in accordance with Annex H of ETSI TS 102 366 (E-AC-3) and in ETSI TS 103 190 (AC-4) into one or more of the syntactical elements of an AC-3, E-AC-3, MPEG2, MPEG4 or MPEG-H coded audio bit stream discussed in the previous section. By using an extensible metadata container to carry the parameter metadata within a compressed audio bit stream, extensibility to carry other types of data that are related or unrelated to the compressed audio bit stream is provided. Further, carriage of timestamps that align the parameter metadata with the decoded audio signal is possible. Further still, authentication of the parameter metadata via a digital signature and using a unique key is possible.

According to some example embodiments, a mechanism is provided via a specific payload type of the extensible metadata container that enables the parameter metadata to be delivered to a playback device dynamically upon request via an out-of-band secondary channel and synchronized to the compressed audio frames/samples carried in another primary forward channel, for example, over-the-air, cable, telecommunications, or via the Internet. In this case, the primary and secondary channels are not required to be synchronous. The format of the parameter metadata in the out-of-band secondary channel can be, but is not required to be, a serialized binary format. For example, as an alternative to a serialized binary format, the parameter metadata can be formatted as eXtensible Markup Language (XML).

Figure 10:
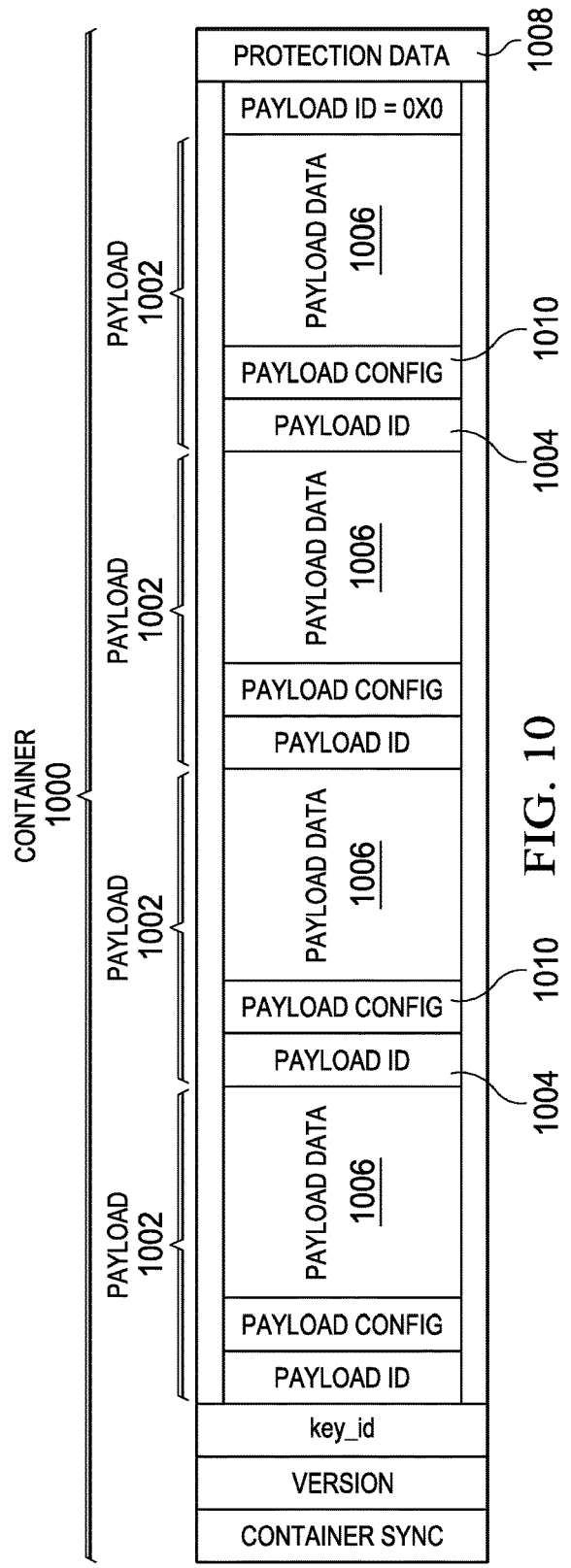
FIG. 10 is a block diagram representing a metadata container for carrying haptic-tactile parameter metadata, according to some example embodiments of the present invention.

Turning now to FIG. 10, it is a block diagram representing an extensible metadata container 1000 for carrying haptic-tactile parameter metadata, according to some example embodiments of the present invention. The container 1000 has one or more payloads (e.g., payload 1002). A payload may include a payload identifier (e.g., 1004) that unambiguously identifies the type of payload data (e.g., 1006) present in the payload. The haptic-tactile parameter metadata may be carried as payload data within one or more payloads of the container 1000.

In some example embodiments, protection data 1008 follows the final payload in the container 1000. The protection data 1008 may be used by a decoding device to verify that the container 1000 and the payload(s) within the container 1000 are error-free and authentic. For example, the protection data 1008 may be used by the decoding device to verify through hashtag checksum verification that the haptic-tactile parameter metadata present as payload data in payload(s) of the container 1000 is uniquely coupled to the compressed audio essence carried in audio blocks within a sync frame.

Figure 11:
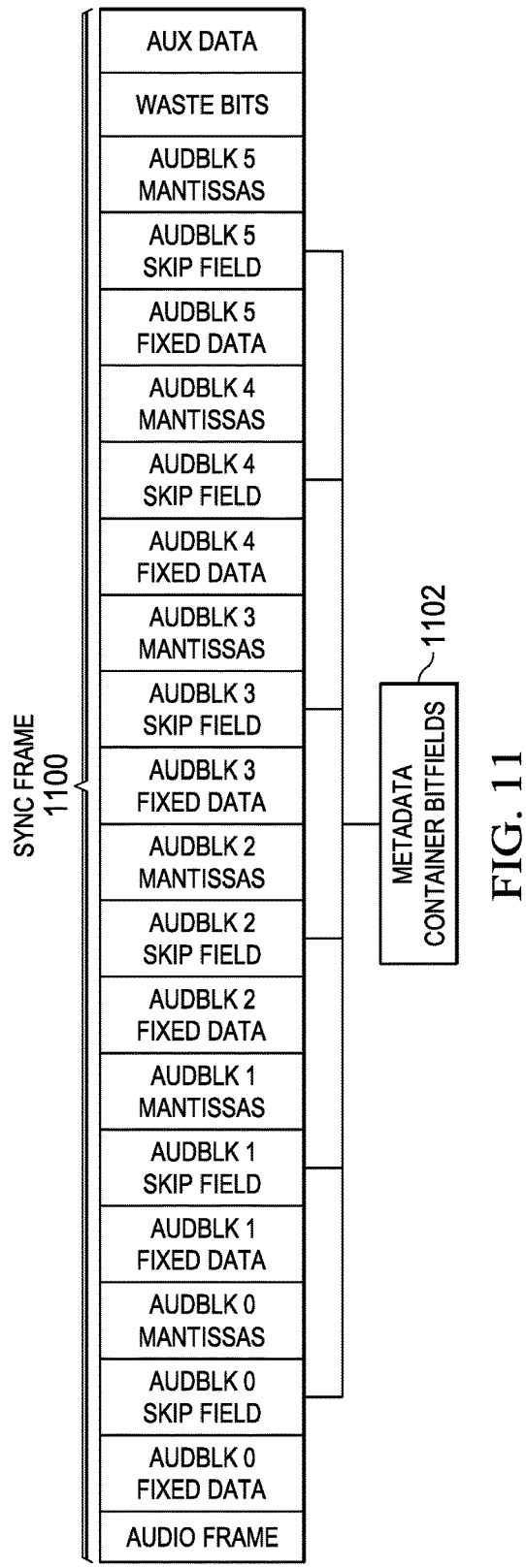
FIG. 11 is a block diagram that represents a sync frame of a compressed audio bit stream, according to some example embodiments of the present invention.

In some example embodiments, the container 1000 carrying haptic-tactile parameter metadata in one or more payloads of the container 1000 is distributed across the skip fields within each of one or more sync frames of an AC-3 or E-AC-3 compressed audio bit stream. For example, FIG. 11 is a block diagram that represents an AC-3 or E-AC-3 sync frame 1100. The extensible metadata container 1000, or a portion thereof, containing haptic-tactile parameter metadata in its payload(s), may be distributed across the skip fields 1102 within the sync frame 1100.

In some example embodiments, a payload (e.g., 1002) of the container 1000 contains a payload configuration field 1010. The payload configuration field 1010 may carry a timestamp parameter. The timestamp parameter may be used at a decoder to time align haptic-tactile parameter metadata in the payload data of the payload with a specific audio sample in the current or a future sync frame. In some example embodiments, the timestamp parameter is generated at the same time the haptic-tactile parameter metadata is generated from the coded haptic-tactile signal 155.

Transport as Ancillary Data

According to some example embodiments of the present invention, haptic-tactile parameter metadata is transported as ancillary data in a bit stream. The format of the ancillary data as data packets within the bit stream may conform to a standard such as, for example, SMPTE 291M.

At least three different techniques for transporting haptic-tactile parameter metadata as ancillary data are contemplated.

Higher Data Rate HANC/VANC

In one technique, haptic-tactile parameter metadata is transported in "user data" in horizontal ancillary data (HANC) packets or vertical ancillary data (VANC) packets. HANC packets are typically used to carry higher data rate ancillary data (e.g., embedded audio) while VANC packets are typically used to carry lower data rate ancillary data (e.g., closed captioned data).

Each HANC or VANC packet is composed of a sequence of 10-bit words. Each 10-bit word encodes an 8-bit data value using an extra parity bit and an extra inverse bit. One of the words near the beginning of the packet contains a Data Identifier value (DID) which may range between 1 and 255 (0xFF). If the DID is equal to 128 (0x80) or greater, then the packet is known as a Type 1 packet. If the DID is less than 128 (0x80), then packet is known as a Type 2 packet. For Type 1 packets, the DID by itself identifies the general type of ancillary data in the payload of the packet. For Type 2 packets, the DID in conjunction with a Secondary Data Identifier value (SDID) identifies the type of ancillary data in the packet. If present in the packet, the SDID may be encoded in the word that immediately follows the word encoding the DID in the packet. Regardless if the packet is Type 1 or Type 2, the packet may contain one or more User Data Word (UDWs) that represent the payload of the packet.

In some example embodiments, haptic-tactile parameter metadata is carried as the data values of one or more UDWs of one or more HANC or VANC packets. In this case, the DID of such a packet that is Type 1 may have a value in the range of 0xC0 and 0xCF (inclusive) and in the range 0x50 and 0x51 (inclusive) if the packet is Type 2. These ranges are reserved by SMPTE 291-2011 for identifying HANC or VANC packets that contain user application data as shown in FIG. 12.

Lower Data Rate VANC

In another technique, haptic-tactile metadata is carried as lower data rate audio metadata in one or more Type 2 VANC packets. The DID for each such packet may be 0x45 which is reserved by SMPTE 291-2011 for identifying compressed audio metadata. For these packets, the SDID is typically used to identify the lowest audio channel pair in a set of predefined audio channel pairs for a given program. Table 1 below reproduces the SDID and channel pair assignments according to SMPTE ST:2020-1:

| Audio Channel Pair | SDID |
| --- | --- |
| No Association | 0x01 |
| Channel pair 1/2 | 0x02 |
| Channel pair 3/4 | 0x03 |
| Channel pair 5/6 | 0x04 |
| Channel pair 7/8 | 0x05 |
| Channel pair 9/10 | 0x06 |
| Channel pair 11/12 | 0x07 |
| Channel pair 13/14 | 0x08 |
| Channel pair 15/16 | 0x09 |

For example, if multiple audio programs are associated with a single video program, then the VANC packet SDID for each of the audio programs may be set to the lowest audio channel pair SDID for that program. For example, if 5.1 channel audio data is carried in audio channel pairs (1/2, 3/4, and 5/6) and stereo audio channel data is carried in audio channel pairs (7/8), then the SDID for the corresponding VANC packets may be set to 0x02 and 0x05, respectively.

Figure 13:
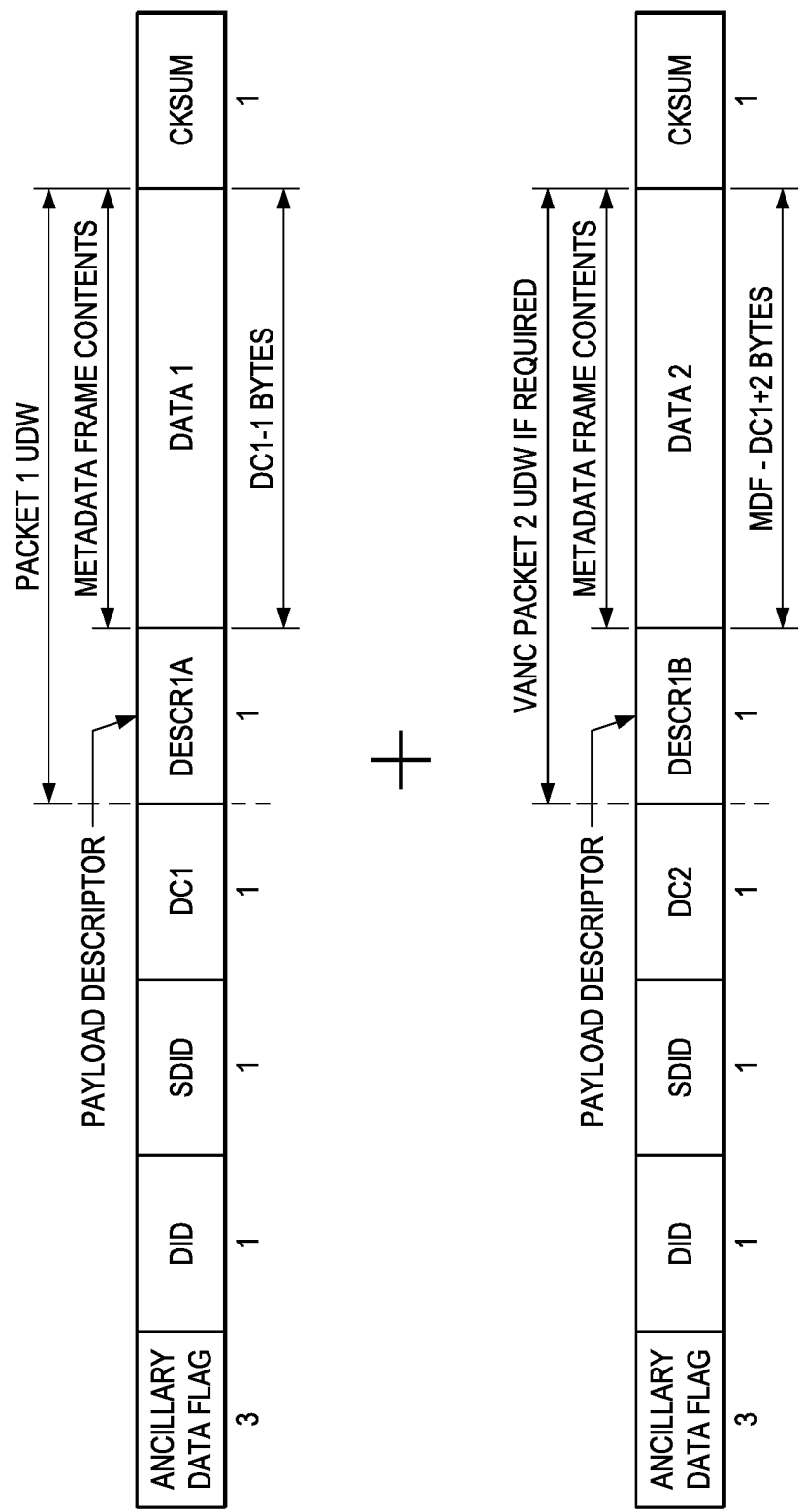
FIG. 13 illustrates in block diagram form vertical ancillary data mapping of audio metadata according to SMPTE standard 2020-2.

According to some example embodiments, haptic-tactile parameter metadata is carried in one or more VANC packets. In particular, the haptic-tactile parameter metadata is carried in the payload of the VANC packets. SMPTE ST: 2020-2 allows for a payload descriptor of 1 byte in VANC packets as shown in FIG. 13 and Table 2 below:

| Bit Position | Name | Description |
| --- | --- | --- |
| 7 (Most Significant Bit) | COMPATIBILITY | Set to "0" |
| 6 | Reserved | Future Use - set to "0" |
| 5 | Reserved | Future Use - set to "0" |
| 4 | VERSION (MSB) | Two bit value used to indicate syntax revision for mapping scheme - set to "01" |
| 3 | VERSION (LSB) | |
| 2 | DOUBLE_PKT | Set to "1" when the metadata frame is carried in two VANC packets. |
| 1 | SECOND_PKT | Set to "1" when this VANC packet is the second of two packets in a video frame. |
| 0 (Least Significant Bit) | DUPLICATE_PKT | Set to "1" when this VANC packet duplicates the one in the previous video frame. |

According to some example embodiments, to indicate that the payload contains haptic-tactile parameter metadata and not audio metadata, reserved bits 5 and 6 of the payload descriptors in the packets carrying the haptic-tactile parameter metadata are set appropriately. For example, bit 6 may be set to 0 and bit 5 set to 1, to indicate that the payload of the packet contains haptic-tactile parameter metadata. Alternatively, bit 6 may be set to 1 and bit 5 set to 0.

Lower Data Rate HANC

In another technique, haptic-tactile metadata is carried as horizontal auxiliary data in one or more Type 1 HANC packets. In this case, the DID for each such packet may be in the range of 0xE0 and 0xE7 inclusive. This range is reserved by SMPTE 291-2011 for identifying audio data in HANC space (HDTV).

Comparison of HANC/VANC Techniques

The foregoing techniques normally do not incur addition overhead associated with packing the haptic-tactile parameter metadata in a wrapper prior to insertion into HANC or VANC packets. For the lower data rate VANC and lower data rate HANC techniques, the haptic-tactile parameter metadata normally will stay in sync with accompanying audio and video during decoding since the haptic-tactile parameter metadata is carrying as part of the audio metadata areas in HANC and VANC packets. Also, using the audio metadata path in HANC and VANC packets for carrying haptic-tactile parameter metadata reduces the risk of decoding and playback equipment discarding HANC or VANC packets carrying haptic-tactile parameter metadata.

Basic Computing Device

Figure 14:
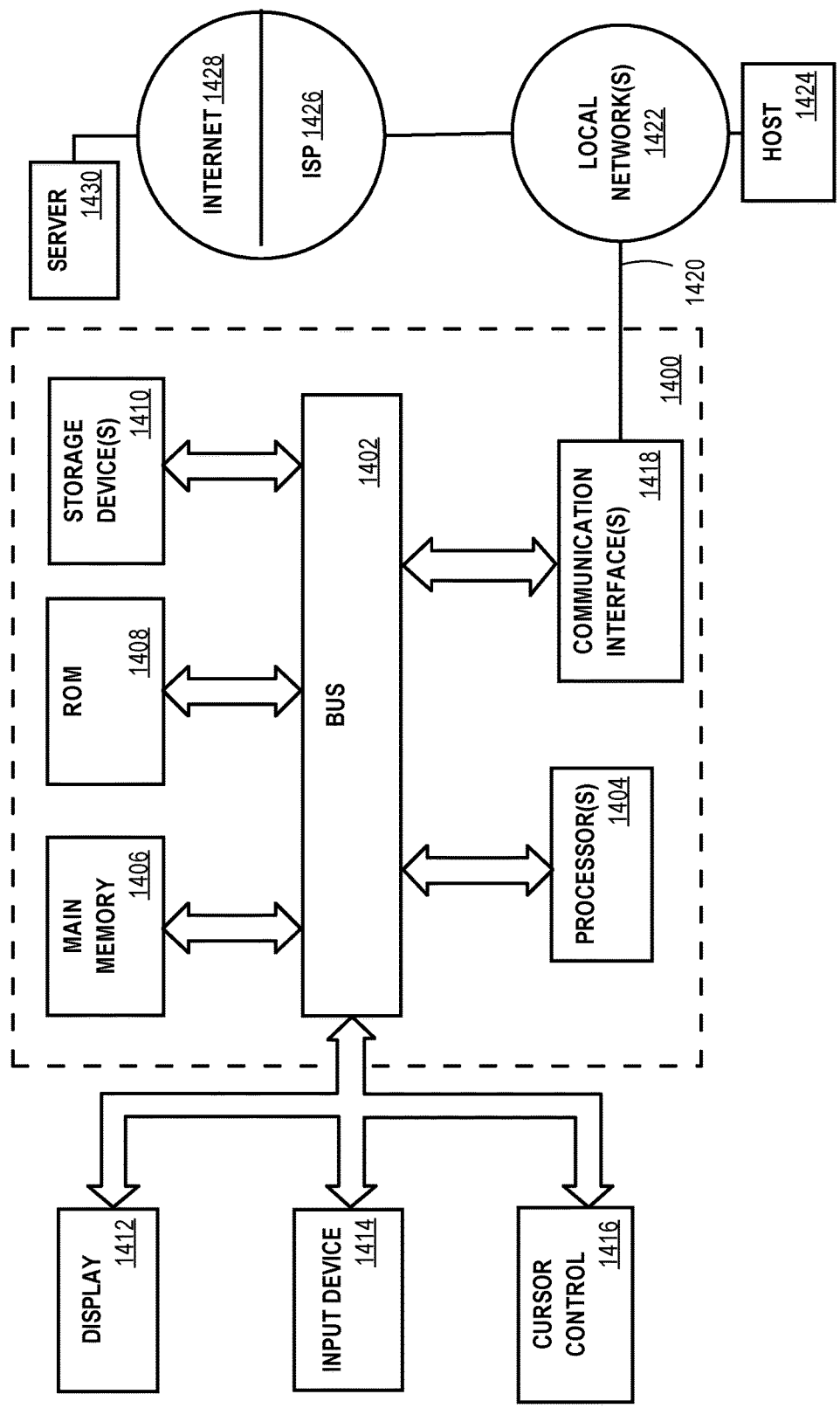
FIG. 14 is a very general block diagram of a computing device in which the example embodiment(s) of the present invention may be embodied.

Referring now to FIG. 14, it is a block diagram that illustrates a basic computing device 1400 in which the example embodiment(s) of the present invention may be embodied. Computing device 1400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1400 may include a bus 1402 or other communication mechanism for addressing main memory 1406 and for transferring data between and among the various components of device 1400.

Computing device 1400 may also include one or more hardware processors 1404 coupled with bus 1402 for processing information. A hardware processor 1404 may be a general purpose microprocessor, a system on a chip (SoC), or other processor.

Main memory 1406, such as a random access memory (RAM) or other dynamic storage device, also may be coupled to bus 1402 for storing information and software instructions to be executed by processor(s) 1404. Main memory 1406 also may be used for storing temporary variables or other intermediate information during execution of software instructions to be executed by processor(s) 1404.

Software instructions, when stored in computer-readable media accessible to processor(s) 1404, render computing device 1400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1400 also may include read only memory (ROM) 1408 or other static storage device coupled to bus 1402 for storing static information and software instructions for processor(s) 1404.

One or more mass storage devices 1410 may be coupled to bus 1402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1410 (e.g., the main hard disk for the device) stores a body of program and data for directing operation of the computing device, including an operating system, user application programs, driver and other support files, as well as other data files of all sorts.

Computing device 1400 may be coupled via bus 1402 to display 1412, such as a liquid crystal display (LCD) or other electronic visual display, for displaying information to a computer user. In some configurations, a touch sensitive surface incorporating touch detection technology (e.g., resistive, capacitive, etc.) may be overlaid on display 1412 to form a touch sensitive display for communicating touch gesture (e.g., finger or stylus) input to processor(s) 1404.

An input device 1414, including alphanumeric and other keys, may be coupled to bus 1402 for communicating information and command selections to processor 1404. In addition to or instead of alphanumeric and other keys, input device 1414 may include one or more physical buttons or switches such as, for example, a power (on/off) button, a "home" button, volume control buttons, or the like.

Another type of user input device may be a cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

While in some configurations, such as the configuration depicted in FIG. 14, one or more of display 1412, input device 1414, and cursor control 1416 are external components (i.e., peripheral devices) of computing device 1400, some or all of display 1412, input device 1414, and cursor control 1416 are integrated as part of the form factor of computing device 1400 in other configurations.

Functions of the disclosed systems, methods, and modules may be performed by computing device 1400 in response to processor(s) 1404 executing one or more programs of software instructions contained in main memory 1406. Such software instructions may be read into main memory 1406 from another storage medium, such as storage device(s) 1410. Execution of the software instructions contained in main memory 1406 cause processor(s) 1404 to perform the functions of the example embodiment(s).

While functions and operations of the example embodiment(s) may be implemented entirely with software instructions, hard-wired or programmable circuitry of computing device 1400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more software instructions to processor(s) 1404 for execution. For example, the software instructions may initially be carried on a magnetic disk or solid-state drive of a remote computer. The remote computer can load the software instructions into its dynamic memory and send the software instructions over a telephone line using a modem. A modem local to computing device 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor(s) 1404 retrieves and executes the software instructions. The software instructions received by main memory 1406 may optionally be stored on storage device(s) 1410 either before or after execution by processor(s) 1404.

Computing device 1400 also may include one or more communication interface(s) 1418 coupled to bus 1402. A communication interface 1418 provides a two-way data communication coupling to a wired or wireless network link 1420 that is connected to a local network 1422 (e.g., Ethernet network, Wireless Local Area Network, cellular phone network, Bluetooth wireless network, or the like). Communication interface 1418 sends and receives electrical, electromagnetic, or optical signals that carry digital data streams representing various types of information. For example, communication interface 1418 may be a wired network interface card, a wireless network interface card with an integrated radio antenna, or a modem (e.g., ISDN, DSL, or cable modem).

Network link(s) 1420 typically provide data communication through one or more networks to other data devices. For example, a network link 1420 may provide a connection through a local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network(s) 1422 and Internet 1428 use electrical, electromagnetic or optical signals that carry digital data streams. The signals through the various networks and the signals on network link(s) 1420 and through communication interface(s) 1418, which carry the digital data to and from computing device 1400, are example forms of transmission media.

Computing device 1400 can send messages and receive data, including program code, through the network(s), network link(s) 1420 and communication interface(s) 1418. In the Internet example, a server 1430 might transmit a requested code for an application program through Internet 1428, ISP 1426, local network(s) 1422 and communication interface(s) 1418.

The received code may be executed by processor 1404 as it is received, and/or stored in storage device 1410, or other non-volatile storage for later execution.

Basic Software System

Figure 15:
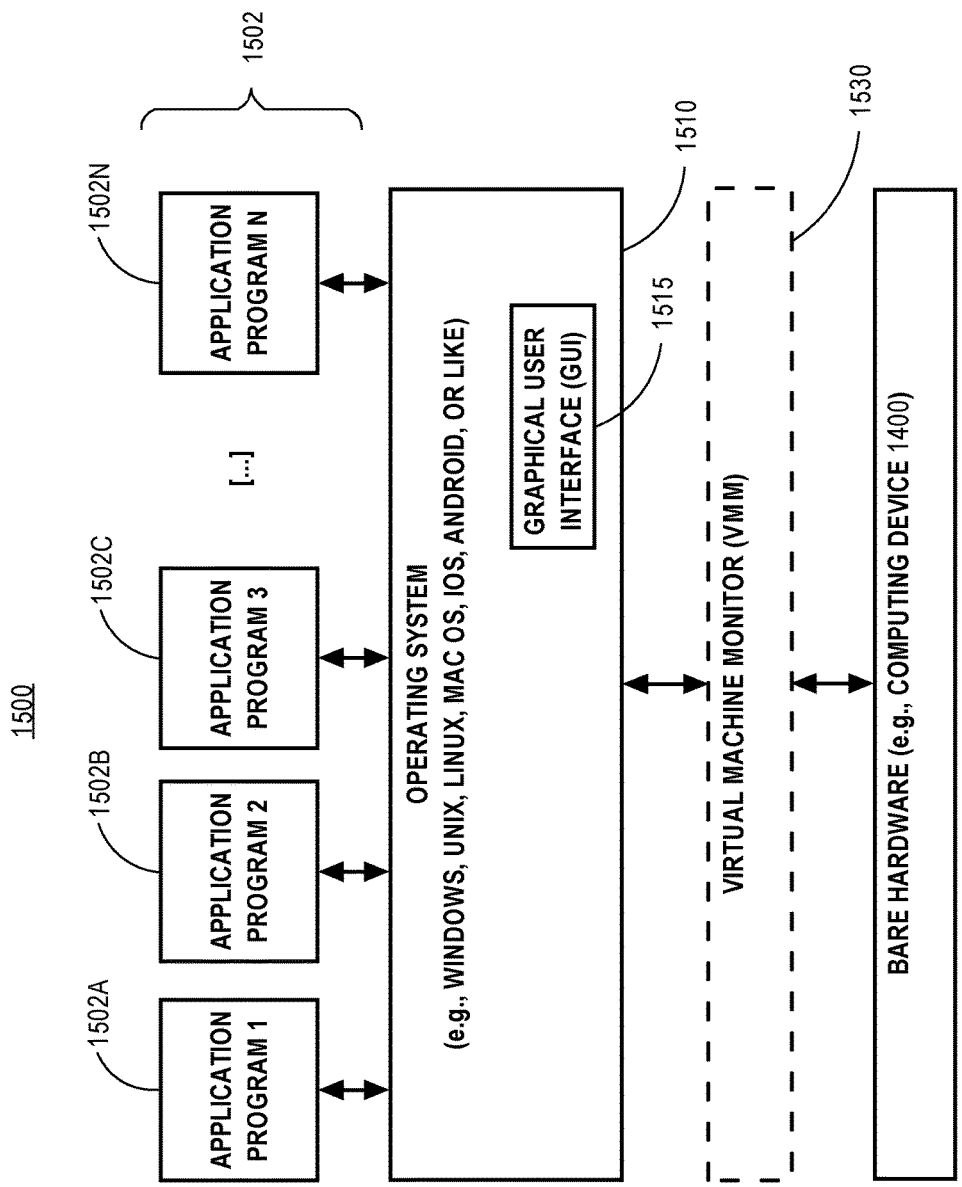
FIG. 15 is a block diagram of a basic software system for controlling the operation of the computing device.

FIG. 15 is a block diagram of a basic software system 1500 that may be employed for controlling the operation of computing device 1400. Software system 1500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1500 is provided for directing the operation of computing device 1400. Software system 1500, which may be stored in system memory (RAM) 1406 and on fixed storage (e.g., hard disk or flash memory) 1410, includes a kernel or operating system (OS) 1510. The OS 1510 manages low-level aspects of computer operation, including managing execution of processes, memory allocation, file input and output (I/O), and device I/O. One or more application programs, represented as 1502A, 1502B, 1502C . . . 1502N in FIG. 15, may be "loaded" (e.g., transferred from fixed storage 1410 into memory 1406) for execution by the system 1500. The applications or other software intended for use on device 1500 may also be stored as a set of downloadable computer-executable instructions, for example, for downloading and installation from an Internet location (e.g., a Web server).

Software system 1500 includes a graphical user interface (GUI) 1515, for receiving user commands and data in a graphical (e.g., "point-and-click" or "touch gesture") fashion. These inputs, in turn, may be acted upon by the system 1500 in accordance with instructions from operating system 1510 and/or application(s) 1502. The GUI 1515 also serves to display the results of operation from the OS 1510 and application(s) 1502, whereupon the user may supply additional inputs or terminate the session (e.g., log off).

OS 1510 can execute directly on the bare hardware 1520 (e.g., processor(s) ~04) of device ~00. Alternatively, a hypervisor or virtual machine monitor (VMM) 1530 may be interposed between the bare hardware 1520 and the OS 1510. In this configuration, VMM 1530 acts as a software "cushion" or virtualization layer between the OS 1510 and the bare hardware 1520 of the device 1400.

VMM 1530 instantiates and runs one or more virtual machine instances ("guest machines"). Each guest machine comprises a "guest" operating system, such as OS 1510, and one or more applications, such as application(s) 1502, designed to execute on the guest operating system. The VMM 1530 presents the guest operating systems with a virtual operating platform and manages the execution of the guest operating systems.

In some instances, the VMM 1530 may allow a guest operating system to run as if it is running on the bare hardware 1520 of device 1400 directly. In these instances, the same version of the guest operating system configured to execute on the bare hardware 1520 directly may also execute on VMM 1530 without modification or reconfiguration. In other words, VMM 1530 may provide full hardware and CPU virtualization to a guest operating system in some instances.

In other instances, a guest operating system may be specially designed or configured to execute on VMM 1530 for efficiency. In these instances, the guest operating system is "aware" that it executes on a virtual machine monitor. In other words, VMM 1530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

Various aspects of the present invention may be appreciated from the following enumerated example embodiments (EEESs):

EEE 1. A method, comprising:
   at a computing device comprising one or more processors and memory storing one or more programs executed by the one or more processors to perform the method, performing operations comprising:
   for at least one frame of a plurality of frames of a source haptic-tactile signal, representing the source haptic-tactile signal in the frame as a set of parameters according a functional representation; and
   including the set of parameters in a bit stream;
   wherein the functional representation is based on one of Chebyshev functionals of the first kind through order n, Chebyshev functionals of the second kind through order n, or k-th order polynomial approximation.

EEE 2. The method of claim 1, wherein the functional representation is based on Chebyshev functionals of the first kind through order n.

EEE 3. The method of claim 2, where n is eight.

EEE 4. The method of claim 1, wherein the functional representation is based on Chebyshev functionals of the second kind through order n.

EEE 5. The method of claim 2, where n is eight.

EEE 6. The method of claim 1, wherein the functional representation is based on k-th order polynomial approximation.

EEE 7. The method of claim 6, wherein k is eight or ten.

EEE 8. The method of claim 1, further comprising analyzing at least one of the plurality of frames over a thirty two (32) millisecond window.

EEE 9. The method of claim 1, further comprising including the set of parameters in at least one of an auxiliary data field, an addbsi data field, a skip field, or a wastebit field of an AC-3 or E-AC-3 formatted compressed audio bit stream.

EEE 10. The method of claim 1, further comprising including the set of parameters in at least one of a data_stream element (DSE) or a fil (FIL) element of an MPEG2 or an MPEG 4 compressed audio bit stream.

EEE 11. The method of claim 1, further comprising including the set of parameters in at least one of an MHAS Packet with MHASPacketType of PACTYP_SYSMETA of an MPEG-H compressed audio bit stream.

EEE 12. The method of claim 1, further comprising:
   packaging the set of parameters in one or more payloads of an extensible metadata container; and
   inserting the extensible metadata container containing the set of parameters in a compressed audio bitstream.

EEE 13. The method of claim 1, further comprising including the set of parameters as ancillary data in one or more horizontal ancillary data packets or one or more vertical ancillary data packets.

EEE 14. The method of claim 1, further comprising selecting a frame length for the frame that is equal to a frame length of a related video or audio frame.

EEE 15. The method of claim 1, wherein the bit stream comprises a haptic-tactile data independent frame and another frame comprising differences values relative to absolute values in the haptic-tactile data independent frame.

EEE 16. The method of claim 1, wherein the bit stream comprises a plurality of haptic-tactile data frames that are time aligned with a plurality of video and/or audio frames of one or more other bit streams.

EEE 17. The method of claim 16, wherein the plurality of haptic-tactile data frames are a plurality of haptic-tactile data independent frames; and wherein the plurality of video and/or audio frames are a plurality of video and/or audio independent frames.

EEE 18. A parametric encoder, comprising:
one or more hardware processors configured to perform:
for at least one frame of a plurality of frames of a source haptic-tactile signal, representing the source haptic-tactile signal in the frame as a set of parameters according a functional representation; and
including the set of parameters in a bit stream;
wherein the functional representation is based on one of Chebyshev functionals of the first kind through order n, Chebyshev functionals of the second kind through order n, or k-th order polynomial approximation.

EEE 19. The parametric encoder of claim 18, wherein the functional representation is based on Chebyshev functionals of the first kind through order n.

EEE 20. The parametric encoder of claim 18, wherein the functional representation is based on Chebyshev functionals of the second kind through order n.

EEE 21. The parametric encoder of claim 18, wherein the functional representation is based on k-th order polynomial approximation.

EEE 22. The parametric encoder of claim 18, wherein the one or more hardware processors are further configured to perform analyzing at least one of the plurality of frames over a thirty two (32) millisecond window.

EEE 23. The parametric encoder of claim 18, wherein the one or more hardware processors are further configured to perform including the set of parameters in at least one of an auxiliary data field, an addbsi data field, a skip field, or a wastebit field of an AC-3 or E-AC-3 formatted compressed audio bit stream.

EEE 24. The parametric encoder of claim 18, wherein the one or more hardware processors are further configured to perform including the set of parameters in at least one of a data_stream element (DSE) or a fil (FIL) element of an MPEG2 or an MPEG4 compressed audio bit stream.

EEE 25. The parametric encoder of claim 18, wherein the one or more hardware processors are further configured to perform including the set of parameters in at least one of an MHAS Packet with MHASPacketType of PACTYP_SYSMETA of an MPEG2, an MPEG4 or an MPEG-H compressed audio bit stream.

EEE 26. The parametric encoder of claim 18, wherein the one or more hardware processors are further configured to perform:
packaging the set of parameters in one or more payloads of an extensible metadata container; and
inserting the extensible metadata container containing the set of parameters in a compressed audio bitstream.

EEE 27. The parametric encoder of claim 18, wherein the one or more hardware processors are further configured to perform including the set of parameters as ancillary data in one or more horizontal ancillary data packets or one or more vertical ancillary data packets.

EEE 28. The parametric encoder of claim 18, wherein the one or more hardware processors are further configured to perform selecting a frame length for the frame that is equal to a frame length of a related video or audio frame.

EEE 29. The parametric encoder of claim 18, wherein the bit stream comprises a haptic-tactile data independent frame and another frame comprising differences values relative to absolute values in the haptic-tactile data independent frame.

EEE 30. The parametric encoder of claim 18, wherein the bit stream comprises a plurality of haptic-tactile data frames that are time aligned with a plurality of video and/or audio frames of one or more other bit streams.

EEE 31. The parametric encoder of claim 30, wherein the plurality of haptic-tactile data frames are a plurality of haptic-tactile data independent frames; and wherein the plurality of video and/or audio frames are a plurality of video and/or audio independent frames.

EEE 32. A system comprising:
means for representing frames of a source haptic-tactile signal as sets of parameters according to a functional representation; and
means for including the sets of parameters in a bit stream;
wherein the functional representation is based on one of Chebyshev functionals of the first kind through order n, Chebyshev functionals of the second kind through order n, or k-th order polynomial approximation.

EEE 33. The system of claim 32, further comprising means for selecting a frame length of a frame of the source haptic-tactile signal that is equal to a frame length of a related video or audio frame.

EEE 34. The system of claim 32, further comprising means for producing the bit stream comprising a haptic-tactile data independent frame and another frame comprising differences values relative to absolute values in the haptic-tactile data independent frame.

EEE 35. The system of claim 32, further comprising means for producing the bit stream comprising a plurality of haptic-tactile data frames that are time aligned with a plurality of video and/or audio frames of one or more other bit streams.

EEE 36. The method of claim 32, further comprising means for producing the bit stream comprising a plurality of haptic-tactile data independent frames that are time aligned with a plurality of video and/or audio independent frames of one or more other bit streams.

The invention claimed is:

1. A method for low bit rate parametric encoding and transport of haptic-tactile signals, the method comprising:
at a computing device comprising one or more processors and memory storing one or more programs executed by the one or more processors to perform the method, performing operations comprising:
for at least one frame of a plurality of frames of a source haptic-tactile signal, representing the source haptic-tactile signal in the frame as a set of parameters according to a functional representation, wherein the source haptic-tactile signal represents haptic or tactile interaction with a physical environment; and
including the set of parameters in a bit stream;
wherein the functional representation is based on one of a set of orthogonal functionals, or polynomial approximation.

2. The method of claim 1, further comprising:
receiving a source haptic-tactile signal of sample rate R and bit depth D; and
processing the source haptic-tactile signal into the plurality of frames.

3. The method of claim 1, wherein representing the source haptic-tactile signal in the frame as a set of parameters according to a functional representation comprises:
deriving, as the set of parameters, expansion coefficients of the source haptic-tactile signal according to the functional representation.

4. The method of claim 1, wherein the functional representation is based on one of Chebyshev functionals of the first kind, Chebyshev functionals of the second kind, or polynomial approximation.

5. The method of claim 1, wherein the functional representation is based on Chebyshev functionals of the first or second kind.

6. The method of claim 1, wherein the functional representation is based on Chebyshev functionals of the first kind through order n, where n is eight.

7. The method of claim 1, wherein the functional representation is based on Chebyshev functionals of the second kind through order n, where n is eight.

8. The method of claim 1, wherein the functional representation is based on polynomial approximation.

9. The method of claim 1, wherein the functional representation is based on k-th order polynomial approximation, wherein k is eight or ten.

10. The method of claim 1, further comprising analyzing at least one of the plurality of frames of the source haptic-tactile signal over a thirty two (32) millisecond window.

11. The method of claim 1, further comprising including the set of parameters in at least one of an auxiliary data field, an addbsi data field, a skip field, or a wastebit field of an AC-3 or E-AC-3 formatted compressed audio bit stream.

12. The method of claim 1, further comprising including the set of parameters in a syntactical element of an MPEG2 or MPEG4 formatted compressed audio bit stream.

13. The method of claim 1, further comprising:
packaging the set of parameters in one or more payloads of an extensible metadata container; and
inserting the extensible metadata container containing the set of parameters in a compressed audio bitstream.

14. The method of claim 1, further comprising including the set of parameters as ancillary data in one or more horizontal ancillary data packets or one or more vertical ancillary data packets.

15. A parametric encoder, comprising:
one or more hardware processors configured to perform the method of claim 1.

16. A computer-readable medium carrying one or more sequences of software instructions which, when executed by one or more hardware processors of a parametric encoder, cause the parametric encoder to perform the method of claim 1.

* * * * *